United States Patent
Boutaud

(10) Patent No.: US 11,002,836 B2
(45) Date of Patent: May 11, 2021

(54) PERMUTATION OF MEASURING CAPACITORS IN A TIME-OF-FLIGHT SENSOR

(71) Applicant: Rockwell Automation Technologies, Inc., Mayfield Heights, OH (US)

(72) Inventor: Frederic Boutaud, Lexington, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 452 days.

(21) Appl. No.: 15/978,679

(22) Filed: May 14, 2018

(65) Prior Publication Data

US 2019/0346540 A1  Nov. 14, 2019

(51) Int. Cl.
- *G01C 3/08* (2006.01)
- *G01S 7/4863* (2020.01)
- *G01S 17/18* (2020.01)

(52) U.S. Cl.
CPC .............. *G01S 7/4863* (2013.01); *G01S 17/18* (2020.01)

(58) Field of Classification Search
CPC ........ G01S 7/4863; G01S 17/18; G01S 17/42; G01S 7/4865
See application file for complete search history.

(56) References Cited

U.S. PATENT DOCUMENTS

| | | | | |
|---|---|---|---|---|
| 3,810,115 A | * | 5/1974 | Stafford | ............ G06F 5/015 708/209 |
| 7,623,221 B2 | | 11/2009 | Thun et al. | |
| 9,880,266 B2 | | 1/2018 | Davidovic et al. | |

(Continued)

FOREIGN PATENT DOCUMENTS

| | | |
|---|---|---|
| EP | 2 402 784 A2 | 1/2012 |
| EP | 3 015 881 A2 | 5/2016 |

(Continued)

OTHER PUBLICATIONS

Notice of Allowance received for U.S. Appl. No. 16/139,436 dated Jun. 8, 2020, 47 pages.

Trunk, G.V., "Automatic Detection, Tracking, and Sensor Integration", Chapter 8, Naval Research Laboratory, pp. 8.1-8.23.

IEC, "Safety of machinery—Electro-sensitive protective equipment—Part 3: Particular requirements for Active Opto-electronic Protective Devices responsive to Diffuse Reflection (AOPDDR)", International Standard, IEC 61496-3, Edition 2.0, Feb. 2008, 144 pages.

(Continued)

*Primary Examiner* — Samantha K Abraham
(74) *Attorney, Agent, or Firm* — Amin, Turocy & Watson, LLP

(57) ABSTRACT

A time of flight sensor device is capable of generating accurate propagation time information for emitted light pulses using a small number of measurement cycles by using multiple measuring capacitors to capture more return pulse information per pulse period. To mitigate the effects of mismatched measuring capacitors and reading paths, embodiments of the time of flight sensor device perform multiple measuring sequences per measurement operation, permutating the roles of the measuring capacitors for each of the measuring sequences. The data collected by the measuring capacitors for the multiple measuring sequences is then aggregated and used to compute the propagation time and corresponding distance. This technique mitigate yields accurate measurements despite mismatches between reading paths and measuring capacitors without the need to implement pixel-level calibration and compensation, thereby saving calibration time, memory space, and computing time.

20 Claims, 22 Drawing Sheets

(56) References Cited

U.S. PATENT DOCUMENTS

| | | | |
|---|---|---|---|
| 2004/0151345 A1* | 8/2004 | Morcom | G01S 17/89 382/104 |
| 2006/0192938 A1 | 8/2006 | Kawahito | |
| 2007/0109653 A1 | 5/2007 | Schofield | |
| 2007/0146682 A1 | 6/2007 | Tachino et al. | |
| 2007/0158533 A1 | 7/2007 | Bamji et al. | |
| 2008/0079833 A1 | 4/2008 | Ichikawa et al. | |
| 2008/0297360 A1 | 12/2008 | Knox et al. | |
| 2011/0037969 A1 | 2/2011 | Spickermann et al. | |
| 2011/0043806 A1 | 2/2011 | Guetta et al. | |
| 2011/0058167 A1 | 3/2011 | Knox et al. | |
| 2011/0194099 A1 | 8/2011 | Kamiyama | |
| 2012/0025964 A1 | 2/2012 | Beggs et al. | |
| 2012/0200841 A1 | 8/2012 | Kamiyama et al. | |
| 2012/0262696 A1 | 10/2012 | Eisele et al. | |
| 2014/0240692 A1 | 8/2014 | Tien et al. | |
| 2015/0362586 A1 | 12/2015 | Heinrich | |
| 2016/0124089 A1 | 5/2016 | Meinherz et al. | |
| 2016/0161611 A1 | 6/2016 | Ito et al. | |
| 2016/0342840 A1 | 11/2016 | Mullins et al. | |
| 2018/0045513 A1 | 2/2018 | Kitamura et al. | |
| 2018/0246214 A1 | 8/2018 | Ishii et al. | |
| 2018/0299554 A1 | 10/2018 | Van Dyck et al. | |
| 2018/0329063 A1 | 11/2018 | Takemoto et al. | |
| 2019/0081095 A1 | 3/2019 | Hanzawa et al. | |
| 2019/0174120 A1 | 6/2019 | Wang | |
| 2019/0179017 A1 | 6/2019 | Nagai | |
| 2019/0187290 A1 | 6/2019 | Kim et al. | |
| 2019/0281276 A1 | 9/2019 | Wang et al. | |

FOREIGN PATENT DOCUMENTS

| | | |
|---|---|---|
| EP | 3 141 930 A1 | 3/2017 |
| KR | 10-2017-0140786 A | 12/2017 |
| WO | 2008/152647 A2 | 12/2008 |
| WO | 2017/045618 A1 | 3/2017 |
| WO | 2018/042887 A1 | 3/2018 |

OTHER PUBLICATIONS

Non-Final Office Action received for U.S. Appl. No. 15/708,268 dated Oct. 18, 2019, 41 pages.

Zach et al., "A 2x32 Range-Finding Sensor Array with Pixel-Inherent Suppression of Ambient Light up to 120Klx", Sensors and Mems, 20.7, IEEE International Solid-State Circuits Conference, 2009, pp. 352-353.

Davidovic et al., "A 33 x 25 µm2 Low-Power Range Finder", IEEE, 2012, pp. 922-925.

Chen et al., "Development of a Low-cost Ultra-tiny Line Laser Range Sensor", IEEE/RSJ International Conference on Intelligent Robots and Systems (IROS), Oct. 9-14, 2016, pp. 111-116.

Notice of Allowance received for U.S. Appl. No. 15/708,294 dated Oct. 31, 2019, 21 pages.

Extended European Search Report received for EP Patent Application Serial No. 19173193.4 dated Oct. 25, 2019, 9 pages.

Communication pursuant to Rule 69 EPC received for EP Patent Application Serial No. 19173193.4 dated Dec. 2, 2019, 2 pages.

Extended European Search Report received for EP Patent Application Serial No. 19173194.2 dated Oct. 25, 2019, 8 pages.

Communication pursuant to Rule 69 EPC received for EP Patent Application Serial No. 19173194.2 dated Dec. 2, 2019, 2 pages.

Extended European Search Report received for EP Patent Application Serial No. 19185081.7 dated Nov. 18, 2019, 10 pages.

Non-Final Office Action received for U.S. Appl. No. 16/139,436 dated Mar. 5, 2020, 63 pages.

Communication pursuant to Rule 69 EPC received for EP Patent Application Serial No. 19185081.7 dated Jan. 20, 2020, 2 pages.

Extended European Search Report received for European Patent Application Serial No. 19198920.1 dated Feb. 5, 2020, 8 pages.

Communication pursuant to Rule 69 EPC received for EP Patent Application Serial No. 19198920.1 dated Mar. 30, 2020, 2 pages.

Non-Final Office Action received for U.S. Appl. No. 15/978,728 dated Oct. 2, 2020, 114 pages.

* cited by examiner

PERMUTATION OF MEASURING CAPACITORS IN A TIME-OF-FLIGHT SENSOR

BACKGROUND

The subject matter disclosed herein relates generally to optical sensor devices, and, more particularly, to sensors that use light-based time of flight measurement to generate distance or depth information.

BRIEF DESCRIPTION

The following presents a simplified summary in order to provide a basic understanding of some aspects described herein. This summary is not an extensive overview nor is it intended to identify key/critical elements or to delineate the scope of the various aspects described herein. Its sole purpose is to present some concepts in a simplified form as a prelude to the more detailed description that is presented later.

In one or more embodiments, a time of flight sensor device is provided, comprising an emitter component configured to emit a light pulse at a first time during each measuring sequence of multiple measuring sequences of a distance measurement operation; a photo-sensor component comprising a photo-detector, the photo-detector comprising a photo device configured to generate electrical energy in proportion to a quantity of received light, and multiple measuring capacitors comprising at least a first measuring capacitor connected to the photo device via a first control line switch controlled by a first gating signal, and a second measuring capacitor connected to the photo device via a second control line switch controlled by a second gating signal, wherein the photo-sensor component is configured to, for each measuring sequence set a first signal of the first gating signal or the second gating signal at a second time during the measuring sequence defined relative to the first time, and reset the first signal at a third time during the measuring sequence defined relative to the first time, wherein setting the first signal at the second time and resetting the first signal at the third time causes a first portion of the electrical energy to be stored in a corresponding first capacitor of the first measuring capacitor or the second measuring capacitor, and set a second signal of the first gating signal or the second gating signal at the third time and reset the second signal at a fourth time during the measuring sequence defined relative to the first time, wherein setting the second signal at the third time and resetting the second signal at the fourth time causes a second portion of the electrical energy to be stored in a corresponding second capacitor of the first measuring capacitor or the second measuring capacitor, and wherein the photo-sensor component is further configured to perform the multiple measuring sequences using different first signals and different second signals across the multiple measuring sequences; and a distance determination component configured to determine a propagation time for the light pulse based on first measured values of the first portion of the electrical energy measured on the first capacitor for the multiple measuring sequences and second measured values of the second portion of the electrical energy measured on the second capacitor for the multiple measuring sequences.

Also, one or more embodiments provide a method for measuring a distance of an object, comprising generating, by a photo device of a photo-detector of a time of flight sensor device comprising a processor, electrical energy in proportion to a quantity of light received at the photo device; performing a distance measuring operation comprising multiple measuring sequences, wherein the performing comprises, for each measuring sequence of the multiple measuring sequences: emitting, by the time of flight sensor device, a light pulse at a first time within the measuring sequence, setting, by the time of flight sensor device at a second time during the measuring sequence defined relative to the first time, a first signal selected from a first gating signal or a second gating signal, resetting, by the time of flight sensor device at a third time during the measuring sequence defined relative to the first time, the first signal, wherein the setting the first signal and the resetting the first signal causes a first portion of the electrical energy to be stored in a first capacitor corresponding to the first signal, the first capacitor being one of a first measuring capacitor or a second measuring capacitor respectively corresponding to the first gating signal and the second gating signal, setting, by the time of flight sensor device at the third time, a second signal selected from the first gating signal or the second gating signal, and resetting, by the time of flight sensor device at a fourth time during the measuring sequence defined relative to the first time, the second signal, wherein the setting the second signal and the resetting the second signal causes a second portion of the electrical energy to be stored in a second capacitor corresponding to the second signal, the second capacitor being one of the first measuring capacitor or the second measuring capacitor, and wherein the performing further comprises performing the multiple measuring sequences using different first signals and different second signals for the multiple measuring sequences; and determining, by the time of flight sensor device, a propagation time for the light pulse based on first measured values of the first portion of the electrical energy obtained by the multiple measuring sequences and second measured values of the second portion of the electrical energy obtained by the multiple measuring sequences.

Also, according to one or more embodiments, a non-transitory computer-readable medium is provided having stored thereon instructions that, in response to execution, cause a time of flight sensor device comprising a processor and a photo device that generates electrical energy in proportion to a quantity of received light, to perform operations, the operations comprising performing multiple measuring sequences of a distance measurement operation, wherein the performing comprises, for each measuring sequence of the multiple measuring sequences: assigning each of a first gating signal and a second gating signal to be one of a first signal or a second signal, wherein the first gating signal and the second gating signal control transfer of the electrical energy to a first measuring capacitor and a second measuring capacitor, respectively, initiating emission of a light pulse at a first time within the measuring sequence, setting the first signal at a second time during the measuring sequence defined relative to the first time, resetting the first signal at a third time during the measuring sequence defined relative to the first time, wherein the setting the first signal and the resetting the first signal causes a first portion of the electrical energy to be stored in a first capacitor corresponding to the first signal, and the first capacitor is one of the first measuring capacitor or the second measuring capacitor, setting the second signal at the third time, and resetting the second signal at a fourth time during the measuring sequence defined relative to the first time, wherein the setting the second signal and the resetting the second signal causes a second portion of the electrical energy to be stored in a second capacitor corresponding to the second signal, and the second capacitor is one of the first measuring capacitor or the second measuring capacitor, and wherein the performing further comprises reassigning each of the first gating signal and the second gating signal to be a different one of the first signal or the second signal for different measuring sequences of the multiple measuring sequences; and determining a propagation time for the light pulse based on first measured values of the first portion of the electrical energy obtained by the multiple measuring sequences and second measured values of the second portion of the electrical energy obtained by the multiple measuring sequences.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
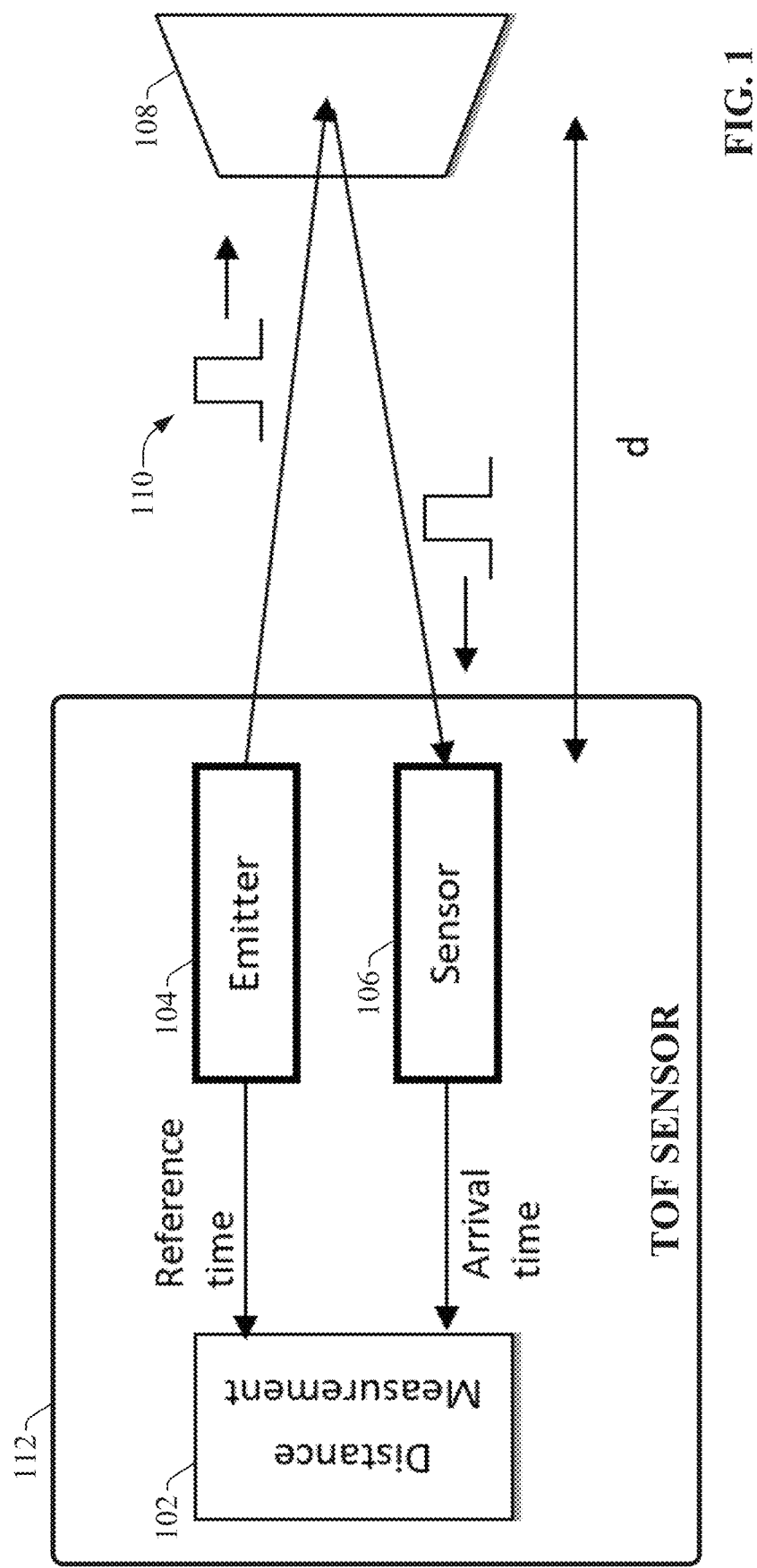
FIG. 1 is a generalized block diagram of a TOF sensor illustrating pulsed light time of flight principles.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Time of Flight (TOF) optical sensors—such as photo detectors or multi-pixel image sensors—are generally used to detect distances of objects or surfaces within a viewing range of the sensor. Such sensors can include, for example, photo detectors that measure and generate a single distance data point for an object within range of the detector, as well as multi-pixel image sensors comprising an array of photo-detectors that are each capable of generating a distance data point for a corresponding image pixel.

Some types of TOF sensors that employ pulsed light illumination measure the elapsed time between emission of a light pulse to the viewing field (or viewing space) and receipt of a reflected light pulse at the sensor's photo-receiver. Since this time-of-flight information is a function of the distance of the object or surface from the sensor, the sensor is able to leverage the TOF information to determine the distance of the object or surface point from the sensor.

FIG. 1 is a generalized block diagram of a TOF sensor 112 illustrating pulsed light time of flight principles. In general, the sensing technology used by some TOF sensors measures the time taken by a light pulse to travel from the sensor's illumination light source—represented by emitter 104—to an object 108 or surface within the viewing field and back to the sensor's light photo-detectors, represented by sensor 106. Sensor 106 can be, for example a dedicated multi-pixel CMOS application-specific integrated circuit (ASIC) imager that integrates specialized means for measuring the position in time of received pulses. Distance measurement components 102 can measure the distance d to the object 108 as $$d=(c/2)t \qquad (1)$$

where c is the speed of light, and t is the measured time of the round trip for the pulse from the emitter 104 to the object 108 and back to the sensor 106.

Emitter 104 of the TOF sensor 112 emits a short pulse 110 into the viewing field. Objects and surfaces within the viewing field, such as object 108, reflect part of the pulse's radiation back to the TOF sensor 112, and the reflected pulse is detected by sensor 106 (e.g., a photo-detector or a photo-sensor such as a photo-diode). Since the speed of light c is a known constant and the time t elapsed between emission and reception of the pulse 110 can be measured, the distance measurement components 102 can determine the distance between the object 108 and the sensor by calculating half of the round-trip distance, as given by equation (1) above. Collectively, the distance information obtained for all pixels of the viewing space yields depth map data for the viewing space. In some implementations, distance measurement components 102 can include a timer that measures the arrival time of the received pulse relative to the time at which emitter 104 emitted the pulse. In general, the TOF sensor 112 generates information that is representative of the position in time of the received pulse.

When radiation of the reflected pulse is incident on the photo-receivers or photo-detectors that make up sensor 106, the incident light is converted into an electrical output proportional to the intensity of the incident light. The distance measurement components 102 then recover and analyze the electrical output in order to identify the pulse, thereby determining that the reflected pulse has been received at the sensor 106. Accurate distance measurement using light pulse time delay estimation depends upon reliable recovery and representation of the reflected light pulse and its time related characteristics.

In some implementations, the photo-detectors of sensor 106 accumulate electrical charges based on the exposure duration of the sensor 106 to the received light pulse radiation relative to a time reference. The accumulated charges translate into a voltage value that is used by the distance measurement components 102 to recognize the pulse. Once the pulse is identified, the distance measurement components 102 can estimate the time that the reflected pulse was received at the TOF sensor relative to the time that the pulse was emitted, and the distance can be estimated based on this time using equation (1) (or another distance determination equation or algorithm that defined distance as a function of light pulse propagation time).

Figure 2:
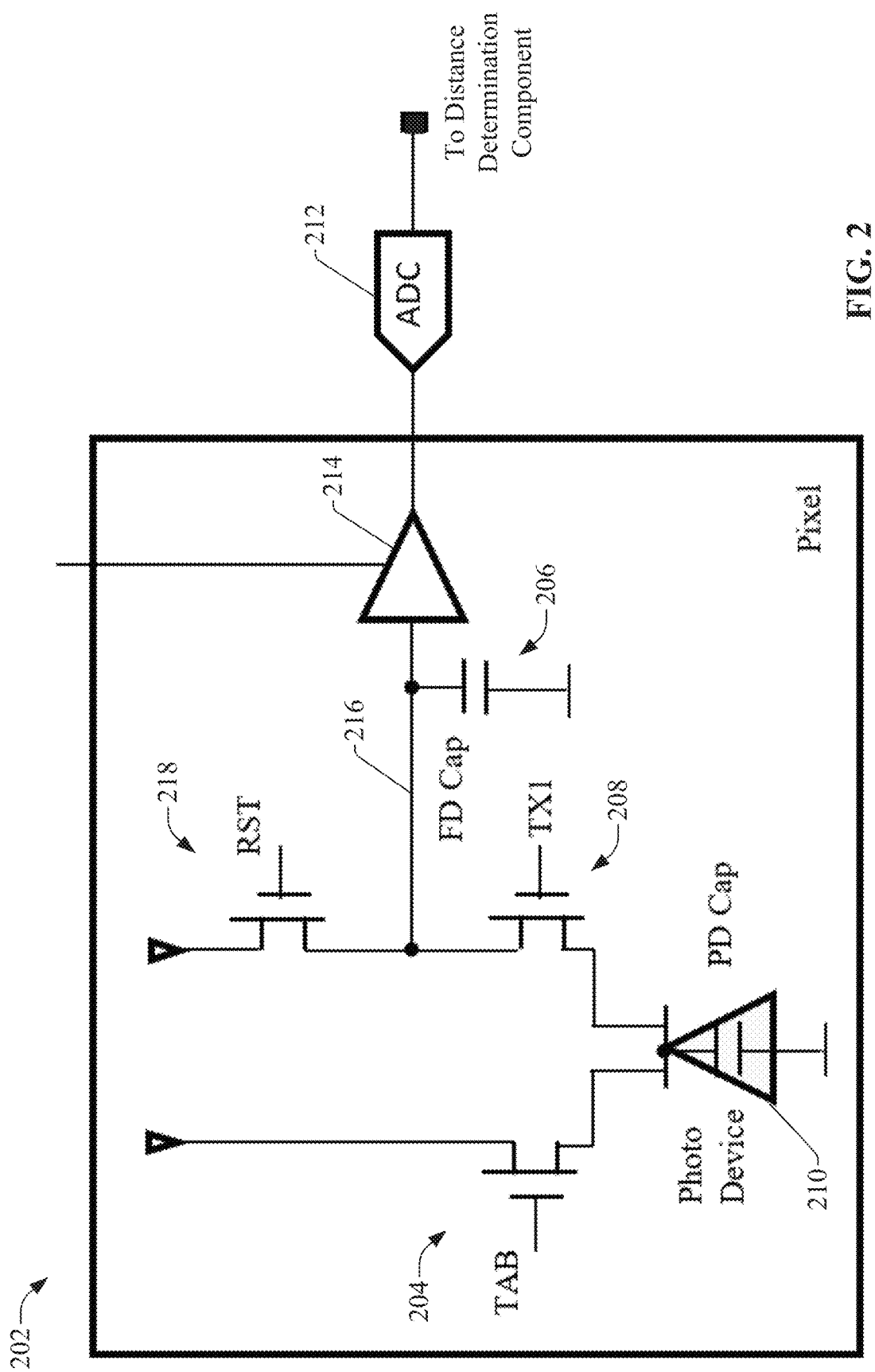
FIG. 2 is a diagram of an example architecture for a single-capacitor photo-detector.

FIG. 2 is a diagram of an example architecture for a single-capacitor photo-detector 202. Photo-detector 202 can correspond to a single pixel, and can be one of an array of photo-detectors that make up the sensor 106 of TOF sensor 112. Collectively, the array of photo-detectors capture received pulse signal information that can be used to calculate distance information for respective pixels of a viewing space being monitored by the TOF sensor 112. The collection of pixel-wise distance data for the viewing space can yield point cloud information that describes a depth or distance topology of the viewing space. Although the present example describes photo-detector 202 as being one of an array of photo-detectors that make up an imaging sensor device, the techniques carried out by photo-detector 202 to measure distance information can also be implemented in a single-point photo-sensor that generates only a single distance value for an object within range of the sensor.

The photo-detector 202 includes a photo device 210 (e.g., a photo-diode and a capacitor (PD Cap)) that generates and stores electrical charges when exposed to light, such as pulsed light from a reflected pulse as well as ambient light. The magnitude of the electrical charge is proportional to the intensity of the light incident on the photo device 210. The photo device 210 is connected to a first switch 204 enabled by an anti-blooming control (TAB) and a second switch 208 enabled by a capture control line (TX1). Switches 204 and 208 can be transistors or other types of switching devices. The charges generated by and stored on the photo device 210 are diverted when the TAB switch 204 is active (e.g., when a logical high control signal is applied to the gate of the TAB switch 204 causing it to become conductive), thereby clearing the charges from the photo device 210. The photo device 210 is connected to a measuring capacitor (e.g., a floating diffusion (FD) capacitor or another type of measuring capacitor) 206 via the control line TX1.

With this configuration, the charges generated by the photo device 210 can also be transferred to the measuring capacitor 206 when the TX1 switch 208 is active (e.g., when a logical high control or gating signal is applied to the gate of the TX1 switch 208). The amount of charge Q stored on the measuring capacitor 206 (transferred from the photo device 210) creates a voltage V on the measuring capacitor (per V=Q/C, where C is the capacitance of the measuring capacitor) that can be read by an analog-to-digital converter (ADC) 212 via an amplifier 214. The ADC 212 converts the magnitude of the voltage to a proportional digital value. In some implementations, to ensure that a sufficiently high level of charge has been accumulated to yield a sufficiently high voltage value that can be accurately measured, photo-detector 202 may be configured to base the distance measurement on a series of received pulses rather than a single received pulse. In such implementations, ADC 212 may be configured to read the magnitude of the voltage on measuring capacitor 206 after a defined number of pulses have been received, such that the voltage on measuring capacitor 206 represents an accumulation of a series of pulses. The accumulated charge (and corresponding voltage) stored on the measuring capacitor 206 can be cleared when a logical high control signal is applied to the gate of the reset (RST) switch 218. The RST switch 218, control line TX1, measuring capacitor 206, and input of the amplifier 214 are connected to the same node 216.

The output of the ADC 212—that is, the digital value representing the amount of electrical charge on measuring capacitor 206—is provided to the distance measurement components 102, which use the value to calculate the propagation time (or time of flight) and corresponding distance for an emitted light pulse.

As photo-detector 202 receives pulsed light, it develops charges that are captured and integrated into the measuring capacitor 206. In this way, each pixel corresponding to a photo-detector 202 generates time-related information and amplitude information (based on charge values) based on received light pulses backscattered by an object in the viewing field illuminated by the emitter component 404.

Figure 3A:
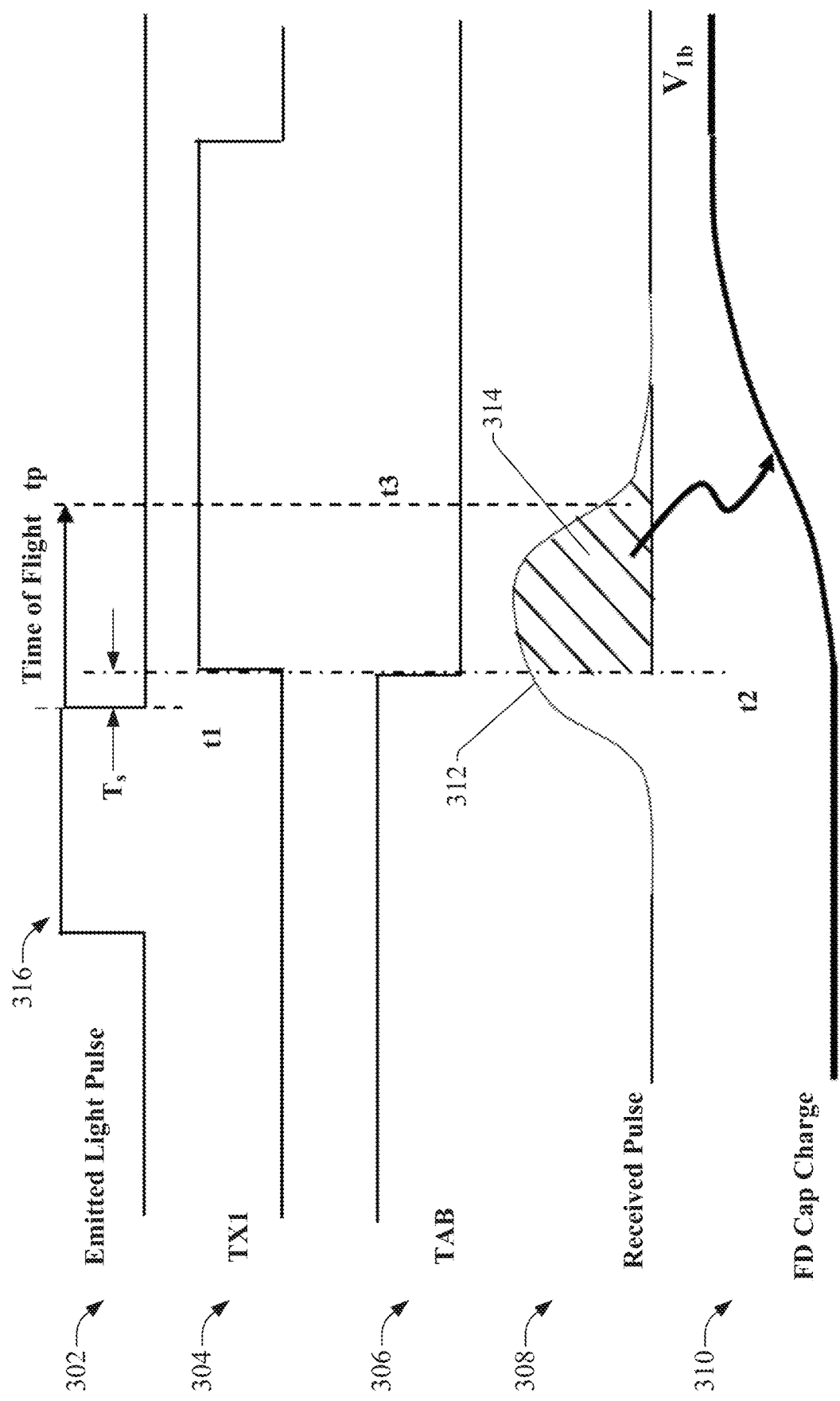
FIG. 3A is a timing diagram illustrating the timing of events for capturing a trailing edge portion of a pulse during a first stage of a single-capacitor distance measurement cycle.
Figure 3B:
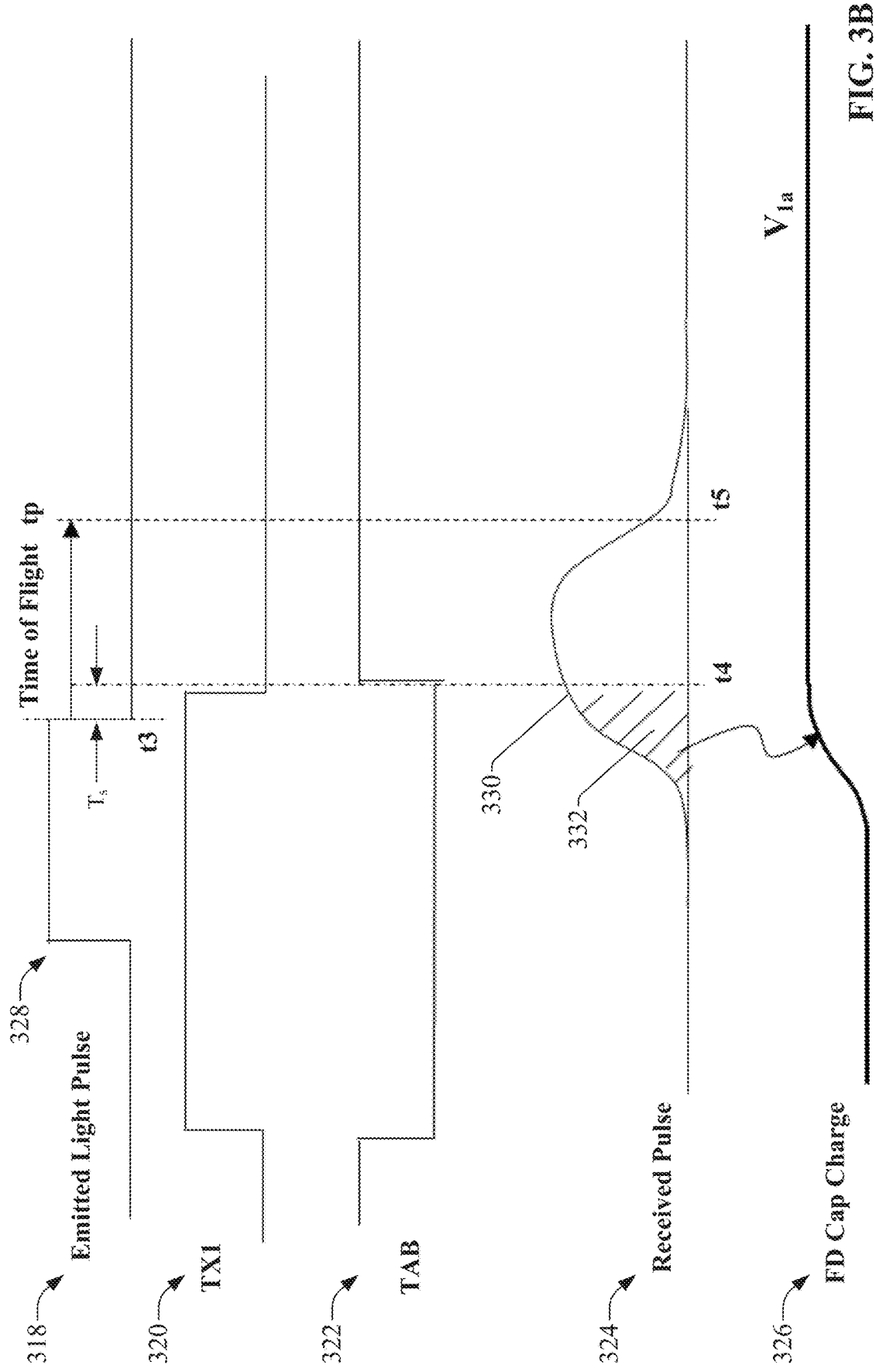
FIG. 3B is a timing diagram illustrating the timing of events for capturing a leading edge portion of a pulse during a first stage of a single-capacitor distance measurement cycle.

FIGS. 3A and 3B are timing diagrams illustrating example timings of events associated with operation of single-capacitor photo-detector 202. In an example operation, photo-detector 202 may execute a two-stage measurement that captures a trailing edge portion of a received pulse (or sequence of pulses) during the first stage and a leading edge portion of another received pulse (or sequence of pulses) during a second stage (or vice versa). The distance measurement components 102 can then calculate the estimated distance based on a ratio of the trailing edge portion to the full pulse value (where the full pulse value is the sum of the trailing and leading edges).

FIG. 3A depicts the timing of events for capturing the trailing edge portion of a pulse during a first stage of the single-capacitor distance measurement cycle. Timing chart 302 represents the timing of the light pulse output modulated by the TOF sensor device's emitter 104, where the high level of chart 302 represents the time at which the emitter 104 is emitting a light pulse (e.g., light pulse 316). Timing charts 304 and 306 represent the timings of the TAB control signal and the TX1 control signal, respectively (that is, the timing of the signals applied to the TAB and TX1 control lines and associated switches 204 and 208). Timing chart 308 represents the amount or intensity of light received at the photo device 210 of the photo-detector 202, where the rise in the chart represents receipt of the reflected pulse 312 corresponding to the emitted pulse. Timing chart 310 represents the amount of charge stored on the measuring capacitor 206 over time. The control signals applied to various control elements of photo-detector 202 can be controlled in accordance with control algorithms executed by the TOF sensor 112.

The time at which the TAB control signal goes low and the TX1 control signal goes high—referred to as the sampling point or split point—is defined to be a constant time relative to the time of emission of the light pulse 316. In the illustrated example, the sampling point occurs at time t2, which is set to be a fixed time relative to the time t1 corresponding to the trailing edge of the emitted pulse 316 (the sampling time may also be defined relative to the leading edge of the emitted pulse 316 in some embodiments). When the TAB control signal goes low and the TX1 control signal goes high at the sampling point (at time t2), the accumulated electrical charge generated by the photo device 210 in response to received light begins transferring to the measuring capacitor 206.

As shown in FIG. 3A, the timing of the TAB and TX1 control signals relative to the received reflected pulse 312 determines the fraction of the total pulse-generated charge that is transferred to measuring capacitor 206. In the illustrated example, the trailing edge of the emitted pulse 316 leaves the emitter at time t1 (see chart 302). At sampling time t2 (after a preset delay relative to time t1), the control signal on the TAB is turned off, and the control signal on the TX1 switch turns ON (see charts 304 and 306), at which time the measuring capacitor 206 begins accumulating charges in proportion to the intensity of the light received at the photo device 210. As shown in chart 308, the reflected pulse 312 corresponding to the emitted pulse 316 begins being received at the photo device 210 some time before time t2 (that is, the rising edge of the reflected pulse 312 is received at the photo device 210 before sampling time t2 when the TX1 control signal goes high). Starting at time t2, when the TX1 control signal goes high, the charge on the measuring capacitor 206 begins increasing in proportion to the level of received light, as shown in chart 310. After receipt of reflected pulse 312, the charge quantity transferred to the measuring capacitor, represented by voltage $V_{1b}$, is proportional to the shaded area 314 under the received pulse timing chart, which is defined between sampling time t2 and the time when the TX1 control signal goes low. Thus, voltage $V_{1b}$ stored on the measuring capacitor 206 is proportional to the area of the trailing slice of the reflected pulse 312 captured after sampling time t2, and is therefore function of the position in time of the received pulse 312 relative to a calibrated time reference (e.g., the falling edge of the TAB control signal at time t2).

Since the time at which the reflected pulse 312 is received is a function of the distance of the object or surface from which the pulse 312 was reflected, the amount of the trailing portion of the reflected pulse that is collected by measuring capacitor 206 as a fraction of the total received pulse is also a function of this distance. Accordingly, at the completion of the first stage of the measuring cycle, distance determination component 408 stores a value (e.g., voltage $V_{1b}$ or a corresponding value of an electrical charge) representing the amount of charge stored on measuring capacitor 206 after completion of the sequence illustrated in FIG. 3A, then initiates the second stage of the measurement cycle depicted in FIG. 3B in order to obtain the leading edge portion of the reflected pulse.

Similar to the timing sequence depicted in FIG. 3A, FIG. 3B includes a timing chart 318 representing an emitted pulse 328 send during the second stage of the measuring cycle; timing charts 320 and 322 representing the timings of the TAB control signal and the TX1 gating signal, respectively (that is, the timing of the signals applied to the TAB and TX1 control lines during the second stage); a timing chart 324 representing the amount or intensity of light received at the photo device 210, where the rise in the chart represents receipt of the reflected pulse 330 corresponding to the emitted pulse 328; and a timing chart 326 representing the amount of charge stored on the measuring capacitor 206 over time.

As can be seen by comparing FIGS. 3A and 3B, the timing of events during the second stage of the measuring cycle differs from that of the first stage in that emitted pulse 328 is sent at a later time relative to the rising edge of the TX1 control signal. This can be achieved by either delaying emission of emitted pulse 328 relative to the first stage, or by switching the TX1 gating signal high at an earlier time relative to the first stage. In the illustrated example, the TX1 gating signal is set high prior to emission of emitted pulse 328 (in contrast to the first stage depicted in FIG. 3A, in which the TX1 signal goes high after emission of emitted pulse 316). To ensure that the portion of the received pulse that was not captured during the first stage is fully captured during the second stage (with little or no overlap between the captured leading and trailing portions), the TAB control signal goes low and the TX1 control signal goes high at a time that is earlier by a duration that is substantially equal to the duration of the TX1 high signal. This causes the falling edge of the TX1 gating signal and the rising edge of the TAB gating signal to occur at substantially the same time— relative the falling edge of emitted pulse 328—as the rising edge of the TX1 control signal and the falling edge of the TAB control signal during the first stage (i.e., the difference between times t4 and t3 during the second stage is substantially equal to the difference between times t2 and t1 during the first stage). This ensures that the sampling point at time t4 slices the received pulse 330 at substantially the same location as the sampling point at time t2 during the first stage. Since the TX1 signal is already set high at the time the reflected pulse 330 is received, this timing causes the leading edge portion 332—the portion of the reflected pulse 330 not captured during the first stage—to be captured by measuring capacitor 206 as a charge quantity represented by voltage value $V_{1a}$.

In general, the nearer the object or surface is to the TOF sensor 112, the earlier in time the reflected pulse (pulse 312 or 330) will be received, and thus the smaller the trailing portion of the pulse charge that will be collected by measuring capacitor 206 during the first stage, and similarly the larger the charge represented by the leading portion of the pulse that will be collected during the second stage. Accordingly, after completion of the first and second stages of the measuring cycle depicted in FIGS. 3A and 3B, TOF sensor 112 can compute the estimated distance based on the ratio of the measured trailing edge portion 314 to the total of the trailing edge portion 314 and the leading edge portion 332.

As demonstrated by the example timing diagrams depicted in FIGS. 3A and 3B, since photo-detector 202 collects and integrates charge using a single measuring capacitor 206, the leading and trailing edge portions must be captured at different times using two separate pulse periods (e.g., the two cycles depicted in FIGS. 3A and 3B). Consequently, the single-capacitor photo-detector architecture requires multiple cycles and multiple pulses to be received and accumulated in order to accurately estimate distance. In order to generate information about the received light pulses more quickly, thereby improving sensor response time, one or more additional measuring capacitors can be added to the photo-detector. For example, two measuring capacitors can be used to collect the leading and trailing edge portions, respectively, within a single pulse cycle, rather than requiring two separate cycles to collect the leading and trailing edge portions. A third measuring capacitor can also be used to collect information about ambient light conditions so that the TOF sensor 112 can compensate for the effects of ambient light incident on the photo-receiver array. The use of multiple measuring capacitors can also compensate for variations in pulse amplitude that may happen in the time between the first stage and the second stage, which could otherwise reduce the accuracy of distance measurement in the single-capacitor architecture.

In the case of photo-detectors that collect received light pulse information using multiple measuring capacitors, there is an assumption that the values of the measuring capacitors and corresponding reading channels are identical. That is, it is assumed that the measuring capacitors have identical capacitance values, and that each measuring capacitor and its associated reading channel will therefore deliver the same electrical output for a given light input.

Realistically, however, there are a number of factors that may produce differences between the measuring channels. For example, there may be small capacitance differences between the measuring capacitors due to manufacturing tolerances. These capacitance differences may also vary as a function of temperature. There may also be differences in the gain of the analog components and conversion characteristics of the ADC 212 associated with each reading channel, which can further distort the distance calculations.

These mismatches between the measuring capacitors and their associated reading channels can be addressed by measuring the mismatches and differences so that the effects of the mismatches can be compensated for when processing the measured data and calculating the distance. However, this approach can be costly in terms of the amount of data that must be measured and stored, increased calibration time, and increased computing time that is required to execute the mismatch corrections. Moreover, the correction and compensation factors may have to be adjusted over the life of the sensor to account for variations due to temperature and age.

To address these and other issues, one or more embodiments of the present disclosure provide a TOF sensor device that employs multiple measuring capacitors per pixel, and that minimizes the effects of unbalanced reading paths and device mismatch without the need for capacitor and reading channel baseline calibration. In one or more embodiments, a photo-sensitive pixel (photo-detector) used for detecting and measuring pulses of light may have two, three, or more measuring capacitors, each connected to its own reading channel. The photo-detector can execute multiple measuring sequences for a given distance measurement operation, permuting the role of each measuring capacitor for each of the measuring sequences. The data collected by these multiple measuring sequences can then be aggregated to determine the propagation time and corresponding distance. This method can improve the overall accuracy of the TOF sensor device without requiring implementation of extensive pixel-level calibration or temperature compensation, thereby saving calibration time, memory space, and computing time.

Figure 4:
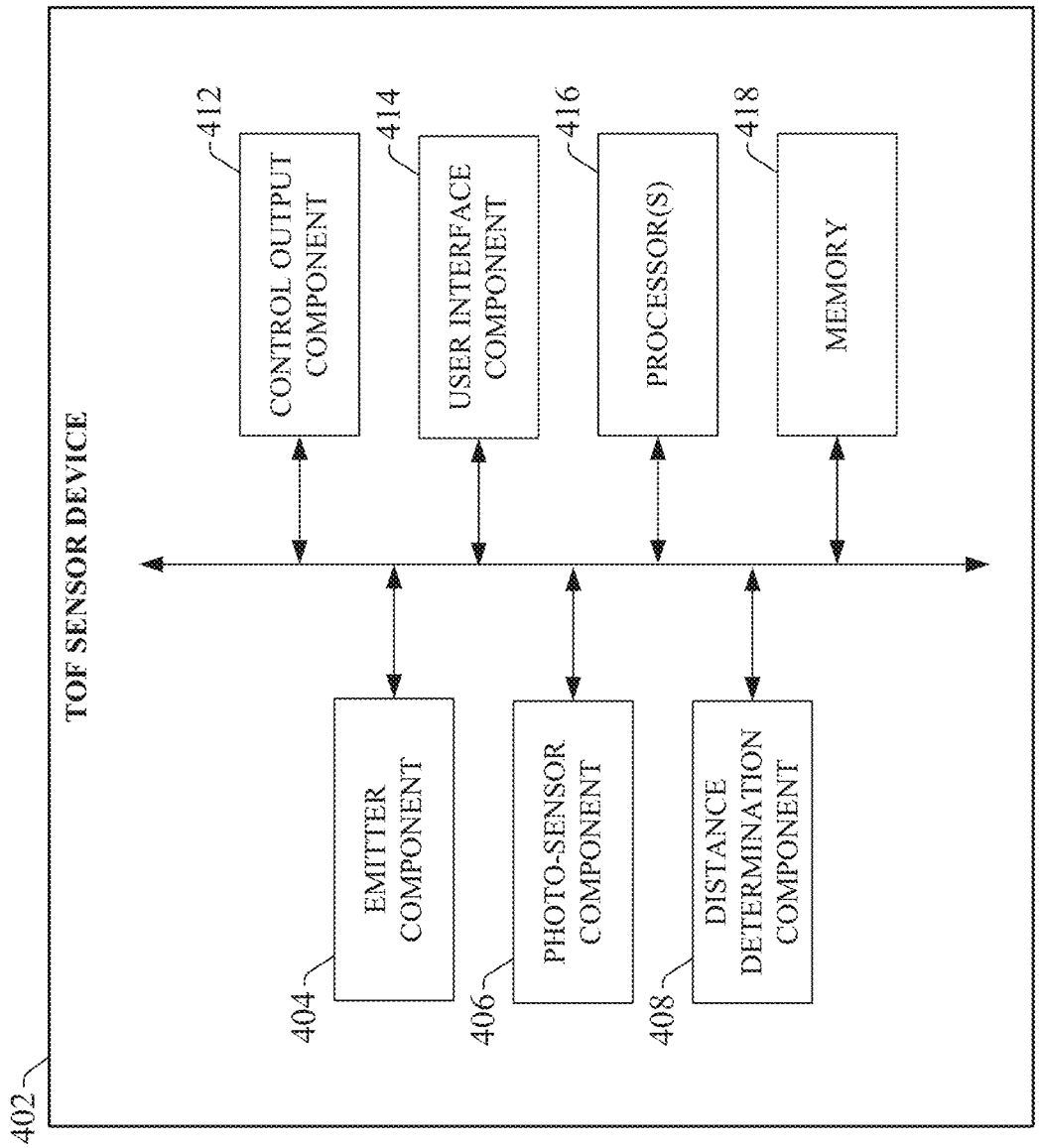
FIG. 4 is a block diagram of an example TOF sensor device.

FIG. 4 is a block diagram of an example TOF sensor device 402 according to one or more embodiments of this disclosure. Although FIG. 4 depicts certain functional components as residing on TOF sensor device 402, it is to be appreciated that one or more of the functional components illustrated in FIG. 4 may reside on a separate device relative to TOF sensor device 402 in some embodiments. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

TOF sensor device 402 can include an emitter component 404, a photo-sensor component 406, a distance determination component 408, a control output component 412, a user interface component 414, one or more processors 416, and memory 418. In various embodiments, one or more of the emitter component 404, photo-sensor component 406, distance determination component 408, control output component 412, user interface component 414, the one or more processors 416, and memory 418 can be electrically and/or communicatively coupled to one another to perform one or more of the functions of the TOF sensor device 402. In some embodiments, one or more of components 404, 406, 408, 412, and 414 can comprise software instructions stored on memory 418 and executed by processor(s) 416. TOF sensor device 402 may also interact with other hardware and/or software components not depicted in FIG. 4. For example, processor(s) 416 may interact with one or more external user interface devices, such as a keyboard, a mouse, a display monitor, a touchscreen, or other such interface devices. TOF sensor device 402 may also include network communication components and associated networking ports for sending data generated by any of components 404, 406, 408, 412, and 414 over a network (either or both of a standard data network or a safety network), or over a backplane.

Emitter component 404 can be configured to control emission of light by the TOF sensor device 402. TOF sensor device 402 may comprise a laser or light emitting diode (LED) light source under the control of emitter component 404. Emitter component 404 can generate pulsed light emissions directed to the viewing field, so that time-of-flight information for the reflected light pulses can be generated by the TOF sensor device 402 (e.g., by the distance determination component 408).

Photo-sensor component 406 can be configured to convert light energy incident on a photo-receiver or photo-detector array to electrical energy for respective pixels of a viewing space, and selectively control the storage of the electrical energy in various electrical storage components (e.g., measuring capacitors) for distance analysis. Distance determination component 408 can be configured to determine a propagation time (time of flight) for emitted light pulses for respective pixels of the viewing space based on the stored electrical energy generated by the photo-sensor component 406, and to further determine a distance value of an object or surface corresponding to a pixel within the viewing space based on the determined propagation time.

The control output component 412 can be configured to analyze and control one or more sensor outputs based on results generated by the distance determination component 408. This can include, for example, sending an analog or digital control signal to a control or supervisory device (e.g., an industrial controller, an on-board computer mounted in a mobile vehicle, etc.) to perform a control action, initiating a safety action (e.g., removing power from a hazardous machine, switching an industrial system to a safe operating mode, etc.), sending a feedback message to one or more plant personnel via a human-machine interface (HMI) or a personal mobile device, sending data over a safety network, or other such signaling actions. In various embodiments, control output component 412 can be configured to interface with a plant network (e.g., a control and information protocol network, and Ethernet/IP network, a safety network, etc.) and send control outputs to other devices over the network connection, or may be configured to send output signals via a direct hardwired connection.

User interface component 414 can be configured to receive user input and to render output to the user in any suitable format (e.g., visual, audio, tactile, etc.). In some embodiments, user interface component 414 can be configured to communicate with a graphical user interface (e.g., a programming or development platform) that executes on a separate hardware device (e.g., a laptop computer, tablet computer, smart phone, etc.) communicatively connected to TOF sensor device 402. In such configurations, user interface component 414 can receive input parameter data entered by the user via the graphical user interface, and deliver output data (e.g., device status, health, or configuration data) to the interface. Input parameter data can include, for example, normalized pulse shape data that can be used as reference data for identification of irregularly shaped pulses, light intensity settings, minimum safe distances or other distance threshold values to be compared with the measured distance value for the purposes of determining when to initiate a control or safety output, or other such parameters. Output data can comprise, for example, status information for the TOF sensor device 402, alarm or fault information, parameter settings, or other such information.

The one or more processors 416 can perform one or more of the functions described herein with reference to the systems and/or methods disclosed. Memory 418 can be a computer-readable storage medium storing computer-executable instructions and/or information for performing the functions described herein with reference to the systems and/or methods disclosed.

Figure 5:
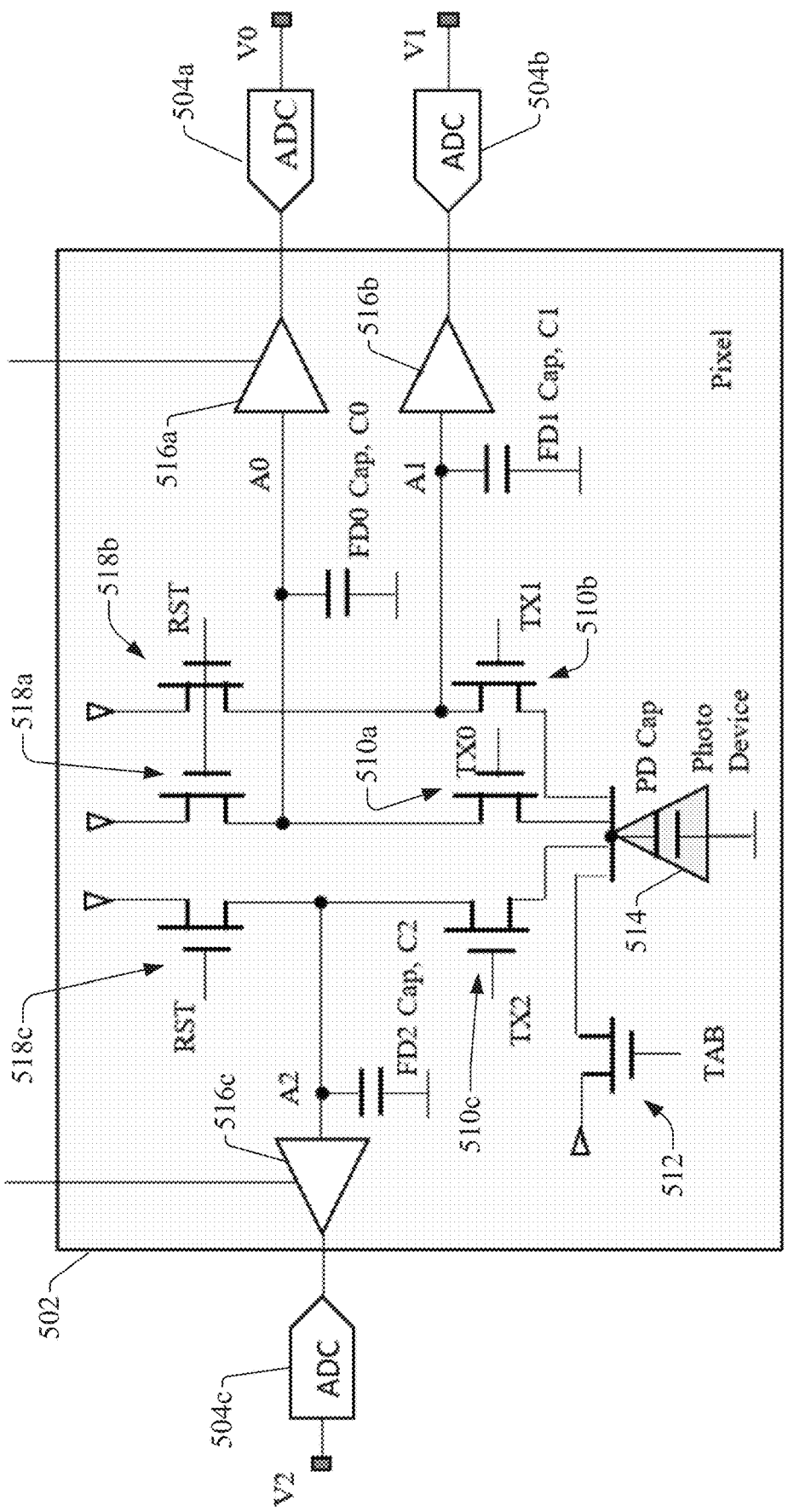
FIG. 5 is a diagram of an example architecture of a photo-detector for a TOF sensor device that includes three measuring capacitors.

FIG. 5 is a diagram of an example architecture of a photo-detector 502 for TOF sensor device 402 that includes three measuring capacitors C0, C1, and C2. Measuring capacitors C0, C1, and C2 can be floating diffusion capacitors, and are also alternately referred to as FD0, FD1, and FD2, respectively. Photo-detector 502 corresponds to a single pixel of a viewing space being monitored by TOF sensor device 402. Photo-detector 502 can be one of an array of photo-detectors 502 that make up a pixel array for the viewing space. Although the present disclosure describes the distance determination features in terms of photo-detector 502, similar techniques can be used to determine time-of-flight distances in other types of photo-sensitive elements, such as photogates.

Similar to the single-capacitor photo-detector 202 described above, charges generated by photo device 514 in response to incident light is transferred to one of the measuring capacitors C0, C1, or C2, where the measuring capacitor that receives the charge is determined by the states of control line (or gating) switches 510, which are controlled by gating signals TX0, TX1 and TX2. Specifically, a high gating signal TX0 causes switch 510a to become conductive, which causes the charge generated by the photo device 514 to be transferred to measuring capacitor C0. Similarly, a high gating signal TX1 causes the switch 510b to become conductive, causing the charge generated by the photo device 514 to be transferred to measuring capacitor C1. A high gating signal TX2 causes switch 510c to become conductive, causing the charge generated by photo device 514 to be transferred to measuring capacitor C2. During a measuring sequence, only one of the gating signals TX0, TX1, or TX2 is activated at a given time, and the timing of each gating signal determines when the charges generated by photo device 514 are directed to, and accumulated into, the corresponding measuring capacitor.

During times when none of the gating signals TX0, TX1, or TX2 are active, the TAB gating signal on the TAB switch 512 is set high, which keeps the TAB switch 512 conductive so that any charges generated by the photo device 514 are drained. This keeps the photo device 514 free of charges until measurement information is to be captured. While any of the gating signals TX0, TX1, or TX2 are set high, the gating signal on the TAB switch 512 is set low. Photo-detector 502 also includes three reset switches 518 respectively connected to the three measuring capacitors C0, C1, and C2 and controlled by an RST gating signal. When the RST gating signal is set high, the reset switches 518 become conductive and connect the measuring capacitors C0, C1, and C2 to ground, clearing the charges (and corresponding voltages) stored on the measuring capacitors.

This multi-capacitor architecture allows electrical charge generated by photo device 514 in response to a single received light pulse to be separated (or split) and stored in different measuring capacitors by switching from one active gating signal to another while the pulsed light is illuminating the pixel. The time of transition from one gating signal to another is referred to herein as the split point or sampling point, since this transition time determines where, along the received pulse waveform, the received pulse is divided or split.

Figure 6:
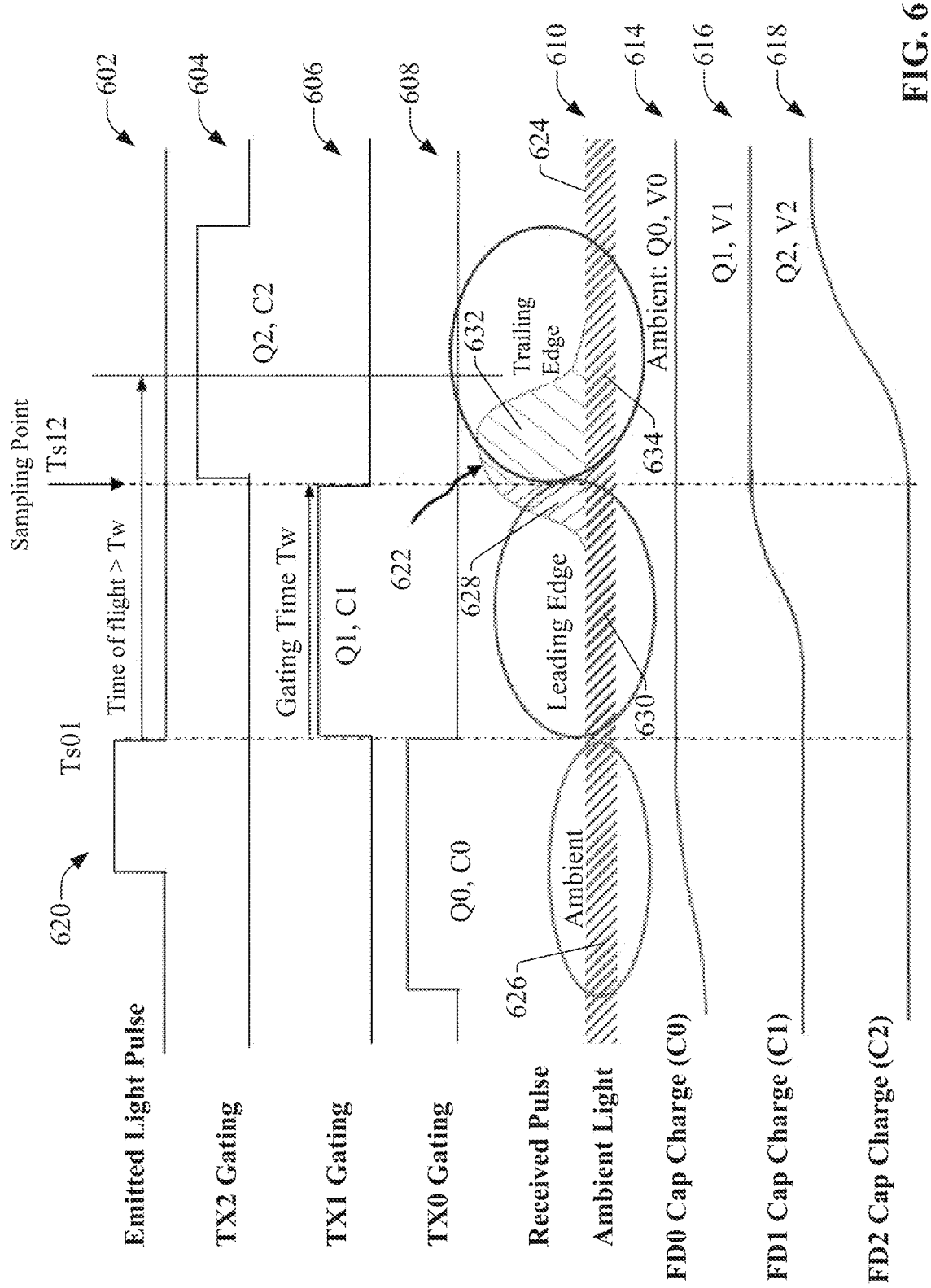
FIG. 6 is a timing diagram illustrating example timings of events associated with operation of a photo-detector.

FIG. 6 is a timing diagram illustrating example timings of events associated with operation of photo-detector 502 for an example pulse period. Emitted light pulse timing chart 602 represents the timing of the light pulse output modulated by the TOF sensor device's emitter component 404, where the high level of chart 602 represents the time at which the emitter component 404 is emitting a light pulse (e.g., light pulse 620). Received pulse timing chart 610 represents the intensity of light received by the photo device 514, where the rise in the intensity represents the received reflected pulse 622 corresponding to the emitted pulse 620 (although emitted pulse 620 is depicted as substantially rectangular, reflected pulse 622 is shown as non-rectangular and somewhat distorted due to possible imperfections in the reading components). In addition to the reflected pulse 622, timing chart 610 also depicts ambient light received at the photo device 514 as a constant flat line 624 above zero (ambient light is assumed to be substantially constant in this example). As part of the initialization process, the anti-blooming gating signal to the TAB switch 512 has been pulsed prior to the timing shown in FIG. 6 in order to clear the photo device 514 of charges, and the RST gating signal has been pulsed to clear any stored charges on the measuring capacitors C0, C1, and C2.

Gating signal timing charts 604, 606, and 608 represent the timings of the TX0, TX1, and TX2 gating signals, respectively. The TX0, TX1, and TX2 gating signals illustrated in FIG. 6 can be controlled by photo-sensor component 406 of TOF sensor device 402. Although FIG. 6 depicts light pulse 620 as being considerably shorter in duration than the durations of the TX0, TX1, and TX3 gating signals, in some implementations the light pulse 620 may have a duration similar to the TX0, TX1, and TX2 gating signals. In the example timing illustrated in FIG. 6, the TX0 gating signal goes high prior to emission of pulse 620, and stays high until a time Ts01, for a total duration or gating time of Tw (the gating integration pulse width). The falling edge of the TX0 gating signal can be set to substantially coincide with the falling edge of the emitted light pulse 620 at time Ts01. While the TX0 control signal is high, the light-driven charges collected by the photo device 514 are transferred to measuring capacitor C0, as shown in the FD0 Cap Charge timing chart 614 by the increasing charge $Q_0$ between the leading edge of the TX0 gating signal and time Ts01. The TX0 gating signal goes low at time Ts01, ending the transfer of charges to measuring capacitor C0 (FD0), and causing the total amount of charge on C0 to level to a value $Q_0$ (corresponding to a voltage $V_0$). In the scenario depicted in FIG. 6, since the TX0 gating signal turns off before reflected pulse 622 is received, charge $Q_0$ (and voltage $V_0$) is representative only of ambient light incident on the photo device 514, represented by the circled shaded region 626 under the received light timing chart 610.

Also at time Ts01, the TX1 gating signal turns on and remains high for the duration of gating time Tw (the same duration as the TX0 gating signal), as shown in the TX1 gating timing chart 606. At the end of the gating time Tw, the TX1 gating signal turns off at time Ts12 (also defined relative to the leading edge of the TX0 gating signal). While the TX1 gating signal is high, light-driven charges from photo device 514 are transferred to measuring capacitor C1 (FD1) as charge $Q_1$, as shown by the increasing $Q_1$ curve between time Ts01 and Ts12 in timing chart 616 (FD1 Cap Charge).

In this scenario, the time-of-flight of the emitted pulse, which is a function of the distance of the object or surface from which the pulse was reflected, is such that the leading edge of reflected pulse 622 is received at the photo device 514 while the TX2 gating signal is on. Consequently, this leading edge 628 of the reflected pulse is captured as a portion of charge $Q_1$ in measuring capacitor C1. Thus, at time Ts12, charge $Q_1$ on measuring capacitor C1 is representative of the leading edge portion (shaded region 628) of reflected pulse 622 as well as any ambient light received at the photo device 514 while the TX1 control signal is high. That is, the amount of charge $Q_1$ (or voltage $V_1$) stored on measuring capacitor C1 is proportional to the shaded region 630 of timing chart 610 (representing the amount of ambient light collected during the duration of the TX1 high signal) plus the shaded region 628 (representing the leading portion of the received pulse 622 without ambient light).

At time Ts12, the TX1 gating signal goes low and the TX2 gating signal goes high, causing the charges from the photo device 514 to begin transferring to the third measuring capacitor C2. The TX2 gating signal is held high for duration Tw (the same gating time used for the TX0 and TX1 gating signals), and is then switched low. The FD2 Cap Charge timing chart 618 illustrates the rise in the accumulated charge on measuring capacitor C2 during this duration. When the TX2 gating signal goes low, the transfer of charge to measuring capacitor C2 ceases, and the amount of charge on C2 levels to a value $Q_2$ (corresponding to voltage $V_2$). Since time Ts12 occurs while reflected pulse 622 is being received in this example scenario, this timing captures the trailing edge portion of the reflected pulse as a portion of charge $Q_2$ on measuring capacitor C2. Thus, charge $Q_2$ represents the trailing edge portion of received pulse 622 (represented by shaded region 632) plus the amount of ambient light collected while the TX2 gating signal was high (represented by shaded region 634).

Using this gating signal timing, and for the pulse time-of-flight represented in FIG. 6, the charges generated by reflected pulse 622 are split between measuring capacitors C1 and C2 at the falling edge of the TX1 gating signal (time Ts12). Time Ts12, corresponding to the falling edge of the TX1 gating signal, is therefore the sampling point in this case. In the scenario depicted in FIG. 6, received pulse 622 has a time of flight delay longer than the gating time Tw. Consequently, the received pulse 622 is not received at the photo-detector 502 until after the TX0 gating signal has gone low, and charge $Q_0$ is representative only of ambient light.

Figure 7:
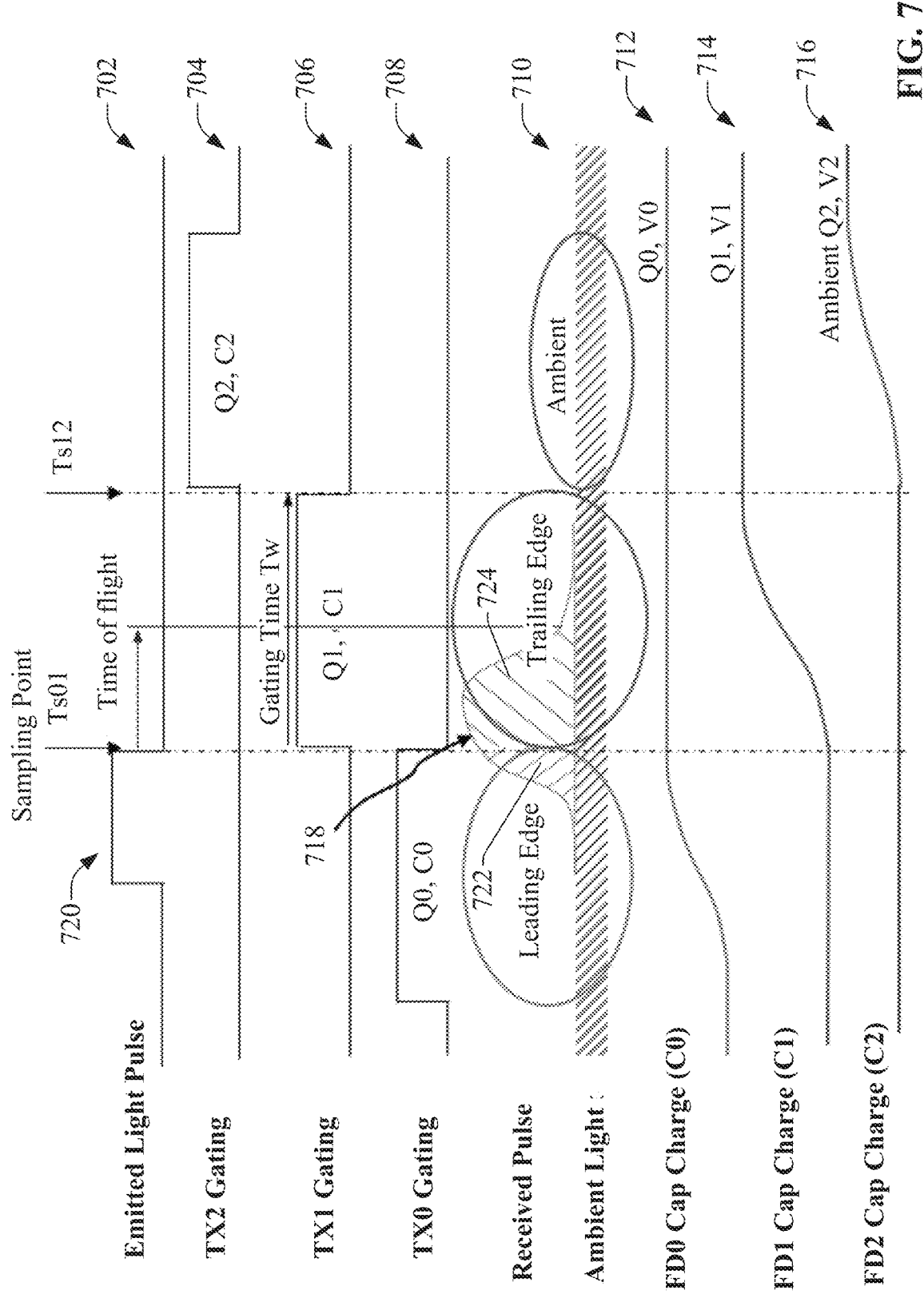
FIG. 7 is another timing diagram illustrating example timings of events associated with operation of the photo-detector.

FIG. 7 is another timing diagram illustrating example timings of events associated with operation of photo-detector 502, for a scenario in which the time of flight for the emitted light pulse 720 (that is, the time from emission of light pulse 720 to receipt of reflected pulse 718 at photo-detector 502) is considerably shorter than that of light pulse 620 of FIG. 6. As shown in timing charts, 702, 704, 706, and 708, the relative timings of the emission of light pulse 720 and the TX0, TX1, and TX2 gating signals are the same as those depicted in FIG. 6. However, because the total time of flight of the emitted pulse 720 is shorter in this scenario relative to the scenario described above (due to the fact that the object or surface from which the pulse is reflected is closer to the TOF sensor device 402), reflected pulse 718 is received at the TOF sensor device 402 earlier in the pulse cycle relative to reflected pulse 622 shown in FIG. 6.

In contrast to the scenario described above in which the pulse time of flight is longer, in this scenario the reflected pulse 718 is received while the TX0 gating signal is still high. Consequently, the charge $Q_0$ on measuring capacitor C0 is not only representative of ambient light, as in FIG. 6, but rather is representative of ambient light plus the leading edge portion 722 of the reflected pulse. Also, the trailing edge portion 724 of reflected pulse 718 is captured by measuring capacitor C1 (rather than C2 as in FIG. 6), since the trailing edge portion 724 is received while the TX1 gating signal is on. Thus, charge $Q_1$ on measuring capacitor C1 is representative of the trailing edge portion 724 plus ambient light.

As can be seen in the respective timing diagrams of FIGS. 6 and 7, whereas the reflected pulse 622 in FIG. 6 was split (or sampled) at time Ts12, causing the leading and trailing edge portions to be split between measuring capacitors C1 and C2, reflected pulse 718 is split at time Ts01 due to the shorter time of flight, causing the leading and trailing edge portions to be split between measuring capacitors C0 and C1. Since reflected pulse 718 has been fully received and captured prior to initiation of the TX2 gating signal, charge $Q_2$ on measuring capacitor C2 is indicative only of ambient light.

The time within the pulse period at which the received pulse is split is referred to as the sampling point. In the case of pulse cycles in which the pulse has a relatively long time of flight (as in FIG. 6), the sampling point will be Ts12, whereas pulse cycles with a relatively short time of flight (as in FIG. 7) will have a sampling point at Ts01. To ensure that the received pulse has only one sampling point, the gating time Tw can be set to be approximately equal to the expected duration between the leading edge and trailing edge of the received pulse (the pulse width $T_0$), to ensure that the pulse is split by only one of the two possible sampling points Ts01 or Ts12, and that the received pulse is unlikely to fall between the sampling times without being split. As illustrated by FIGS. 6 and 7, interpretation of the data stored on each measuring capacitor C0, C1, and C2 changes depending on the sampling point. Specifically, if Ts01 is the sampling point, measuring capacitor C2 records only ambient light, measuring capacitor C0 records ambient light plus the leading edge portion of the received (reflected) pulse, and measuring capacitor C1 records ambient light plus the trailing edge portion of the received pulse. If Ts12 is the sampling point, measuring capacitor C0 records ambient light only, measuring capacitor C1 records ambient light plus the leading edge portion of the received pulse, and measuring capacitor C2 records ambient light plus the trailing edge portion of the pulse.

Once charges $Q_0$, $Q_2$, and Q3 have been accumulated in their respective measuring capacitors for a given pulse sequence, distance determination component 408 of TOF sensor device 402 can identify the sampling point based on a comparison of the charge or voltage values on the measuring capacitors. In an example embodiment, distance determination component 408 can calculate the following two possible pulse amplitude values:

$$\text{Amplitude } 1 = V_0 + V_1 - 2 \cdot V_2 \quad (2)$$

$$\text{Amplitude } 2 = V_1 + V_2 - 2 \cdot V_0 \quad (3)$$

Equations (2) and (3) assume that the voltages $V_0$, $V_1$, and $V_2$ were captured by measuring capacitors having equal capacitance (or by the same measuring capacitor in the case of single-capacitor configurations). Equation (2) represents the amplitude of the light pulse in the scenario in which the sampling point is Ts01 (that is, the scenario illustrated in FIG. 7 for shorter times of flight), whereby voltage $V_2$ on measuring capacitor C2 represents only ambient light. In that scenario, voltage $V_0$ is assumed to represent the leading edge of the reflected pulse plus ambient light, and voltage $V_1$ is assumed to represent the trailing edge of the reflected pulse plus ambient light. Therefore, adding $V_0$ and $V_1$ together and subtracting twice $V_2$ yields a value representing the amplitude of the reflected pulse alone, without ambient light.

Equation (3) represents the amplitude of the light pulse in the scenario in which the sampling point is Ts12 (that is, the scenario illustrated in FIG. 6 for longer times of flight), whereby voltage $V_0$ on measuring capacitor C0 represents only ambient light. In that scenario, voltage $V_1$ is assumed to represent the leading edge of the reflected pulse plus ambient light, and voltage $V_2$ is assumed to represent the trailing edge of the reflected pulse plus ambient light. Therefore, adding $V_1$ and $V_2$ together and subtracting twice $V_0$ yields a value representing the amplitude of the reflected pulse alone, without ambient light.

Distance determination component 408, which may not possess a priori knowledge of which sampling point will split the received reflected pulse into two parts for a given pulse sequence, can determine the sampling point by identifying the largest of the two calculated amplitudes determined according to equations (2) and (3) above. For example, the largest of the two calculated amplitudes may be taken to represent the correct scenario. If distance determination component 408 determines that Amplitude 1 is greater than Amplitude 2, the sampling point is assumed to be Ts01. Alternatively, if distance determination component 408 determines that Amplitude 2 is greater than Amplitude 1, the sampling point is assumed to be Ts12. Other techniques for identifying the correct sampling point (Ts01 or Ts12), and the corresponding correct distance equation, are also within the scope of one or more embodiments.

Figure 8:
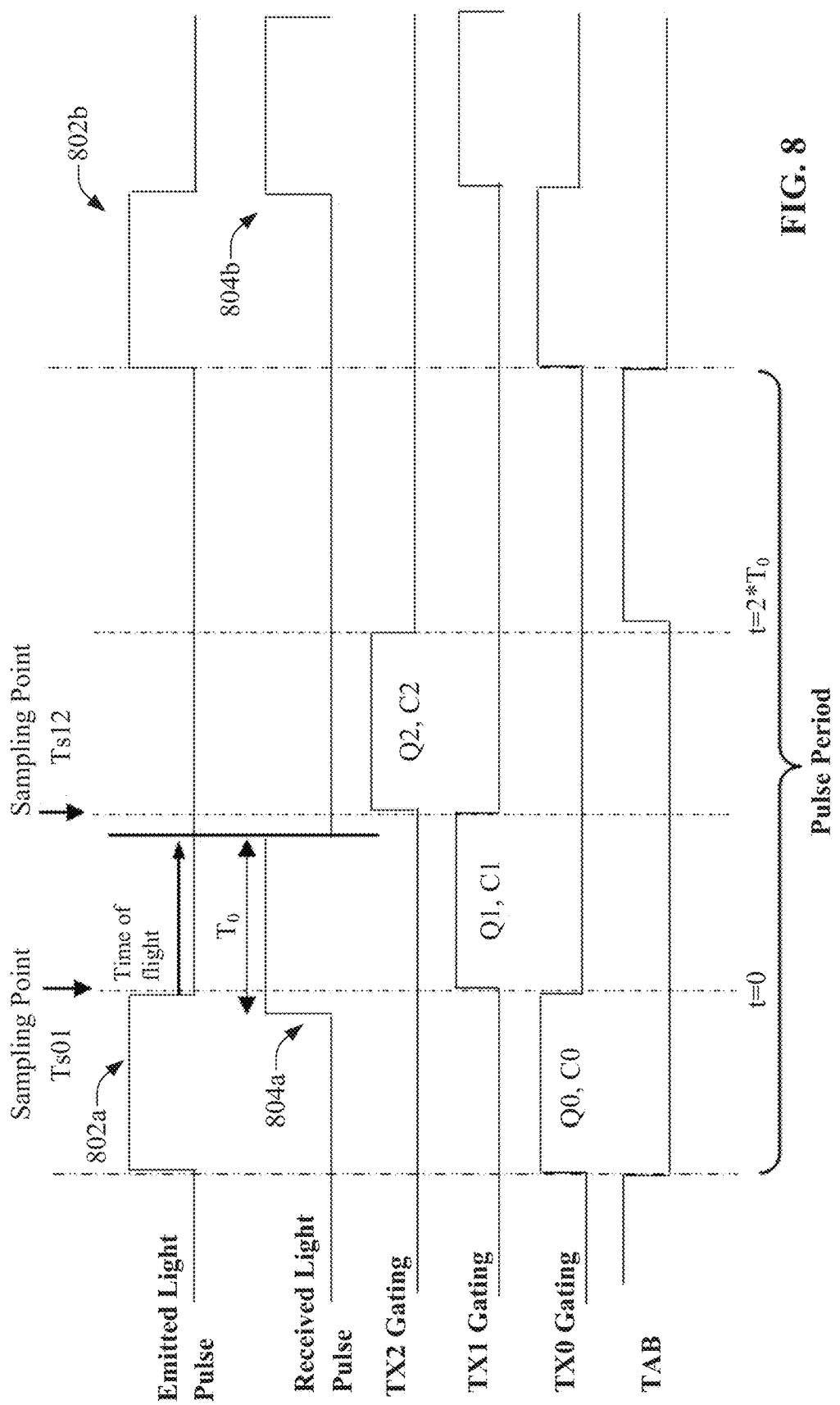
FIG. 8 is a timing diagram illustrating gating timing waveforms during a pulse period.

FIG. 8 is a timing diagram illustrating gating timing waveforms during a pulse period. A pulse period is defined as a time range encompassing emission of a single light pulse 802 and an iteration of the gating control signal sequence (e.g., the sequence depicted in FIGS. 6 and 7) in order to capture charges for the corresponding received pulse. As the time of flight of the emitted pulse 802 increases (as a function of the distance of a reflecting object or surface from the TOF sensor device 402), the received pulse 804 shifts from the first sampling point Ts01 to the second sampling point Ts12. As the receive pulse 804 sweeps from the first sampling point Ts01 to the second sampling point Ts12 in time as a function of time of flight (or object distance), the pulse 804 can be sampled by either Ts01 or Ts12 over a propagation range of twice the pulse width $T_0$, from time t=0 to time t=$2T_0$.

A measuring sequence carried out by the TOF sensor device 402 comprises at least one pulse period with at least one active gating signal during that pulse period. The measuring sequence comprises at least two phases—a pulsing phase and a readout phase.

Figure 9:
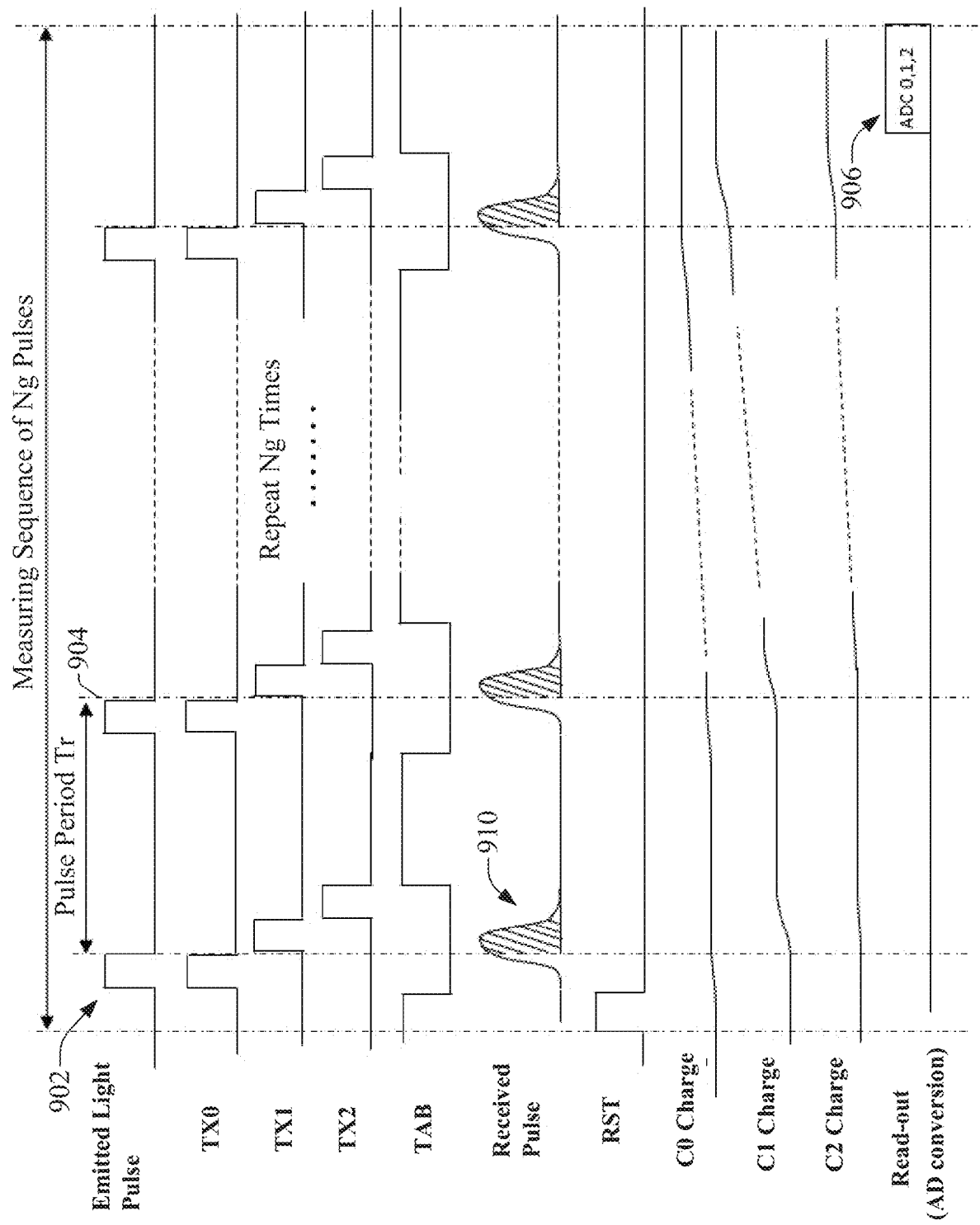
FIG. 9 is a timing diagram illustrating a measuring sequence comprising multiple iterations of a pulse period.

In some embodiments, TOF sensor device 402 can repeat the pulse period—comprising the sequence depicted in FIG. 6 or FIG. 7—multiple times within a single measuring sequence as a burst sequence, and the charges accumulated over the multiple pulse periods can be transferred to and collected by the measuring capacitors. Repeating the pulse period multiple times within a single measuring sequence can ensure that the measuring capacitors accumulate and collect a measurable amount of charge. FIG. 9 is a timing diagram illustrating a measuring sequence comprising multiple iterations of the pulse period described above. As shown in the emitted light pulse timing chart of FIG. 9, a sequence of Ng light pulses 902 are emitted by the TOF sensor device's emitter component 404, and a sequence of corresponding reflected pulses 910 are received at the TOF sensor device's photo-sensor component 406. Concurrently or approximately concurrently with emission of each pulse (or at a defined time after emission of the pulse 902), the control signal of the TAB goes low and the TX0 gating signal goes high, after which the pulse period sequence proceeds as described above in connection with FIGS. 6 and 7. Since the RST control signal is not pulsed during this measuring sequence (but rather is only pulsed at the beginning of the measuring sequence in order to initialize the measuring capacitors), the charges stored on measuring capacitors C0, C1, and C2 are accumulated over the Ng pulse periods under the control of the TX0, TX1, and TX2 gating signals, respectively, without being cleared after each pulse period.

The vertical dashed lines 904 represent the sampling points at which each received pulse 910 is split (Ts01 in the example illustrated in FIG. 9). In the example measuring sequence of FIG. 9, the pulses are split between measuring capacitors C0 and C1 based on the time of flight of the pulse. By repeating this measuring cycle for the sequence of Ng pulses, the charges on measuring capacitors C0, C1, and C2 are accumulated over the Ng received pulses 910 to attain measurable quantities of charge $Q_0$, $Q_1$, and $Q_2$ with an acceptable signal to noise ratio. The number of pulses Ng defining this measuring sequence is referred to as the integration number or gating number.

At the end of this burst sequence, photo-sensor component 406 activates a read-out signal 906 to trigger a reading of the accumulated charges $Q_0$, $Q_1$, and $Q_2$ (or corresponding voltages $V_0$, $V_1$, and $V_2$) from respective measuring capacitors C0, C1, and C2. For embodiments in which the readout channels for the respective measuring capacitors use an ADC 504, as in the architecture depicted in FIG. 5, each readout channel can provide a digital value of the charge or voltage stored on its corresponding measuring capacitor. In other embodiments, each readout channel may output an analog value of its corresponding charge or voltage. In either case, the readout channels provide their respective measured values (analog or digital values of $Q_0$, $Q_1$, and $Q_2$, or of $V_0$, $V_1$, and $V_2$) to the distance determination component 408 for distance calculation.

Figure 10:
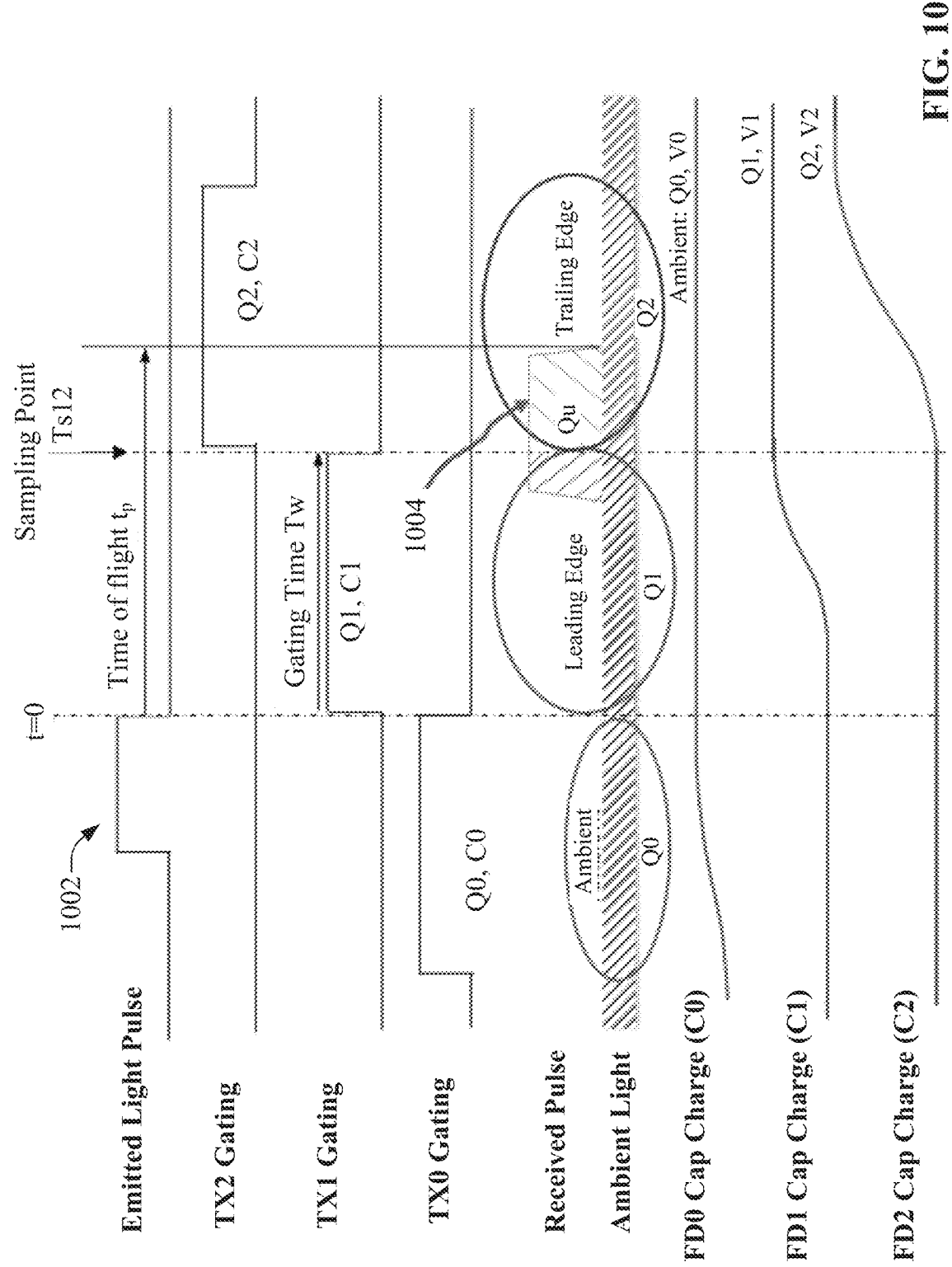
FIG. 10 is a timing diagram illustrating an example pulse period.

The quantity of charges transferred into each of the measuring capacitors depends on the position of the pulse relative to the sampling point. FIG. 10 is a timing diagram illustrating another example pulse period, in which pulse 1002 is emitted by emitter component 404, and corresponding reflected pulse 1004 is received and processed by photo-sensor component 406 (similar to the scenario illustrated in FIG. 6, with charges $Q_0$, $Q_1$, $Q_2$, and Qu labeled on the received pulse and ambient light graph). As noted above, the pulse period illustrated in FIG. 10 may be a single period of a multi-period burst sequence in which multiple pulses 1002 are emitted, and the charges collected for corresponding multiple reflected pulses 1004 are accumulated in measuring capacitors C0, C1, and C2 (see FIGS. 8 and 9).

In the example depicted in FIG. 10, the time of flight $t_p$ of the pulse (a function of object distance) is such that the reflected pulse 1004 is split at sampling point Ts12 (as in the example depicted in FIG. 6). Assuming received pulse 1004 is mostly rectangular, the charges captured by measuring capacitors C2 and C1 when Ts12 is the sampling point can be expressed as:

$$Q_2 = \frac{t_p - T_{s12}}{T_0} Q_u + Q_A \qquad (4)$$

$$Q_1 = \left(1 - \frac{t_p - T_{s12}}{T_0}\right) Q_u + Q_A \qquad (5)$$

$Q_u$ is the total amount of charge generated by the received light pulse 1004 without ambient light (that is, the sum of the leading and trailing edge portions, represented by the shaded area $Q_u$ in FIG. 10) and available for transfer into the measuring capacitors, $Q_A$ is the amount of charge generated by received ambient light during the gating time Tw, and $T_0$ is the pulse width of the received pulse 1004.

Since measuring capacitor C0 stores charge representative of only ambient light when the sampling time is Ts12, then $$Q_0 = Q_A \tag{6}$$

and the total charge generated by pulse 1004 is given by $$Q_u = Q_1 + Q_2 - 2 \cdot Q_0 \tag{7}$$

The charge accumulated in each measuring capacitor generates a voltage based on the capacitance value of each capacitor. Assuming the capacitances of measuring capacitors C0, C1, and C2 are $C_0$, $C_1$, and $C_2$, respectively, the charge accumulated on each measuring capacitor is related to the voltage measured on each capacitor according to the following:

$$Q_0 = C_0 \cdot V_0 \tag{8}$$

$$Q_1 = C_1 \cdot V_1 \tag{9}$$

$$Q_2 = C_2 \cdot V_2 \tag{10}$$

where $V_0$, $V_1$, and $V_2$ are the voltages on measuring capacitors C0, C1, and C2, respectively.

Solving equation (4) for $t_p$ and substituting equations (6) and (7), the time of flight $t_p$ can be expressed as $$t_p = \frac{Q_2 - Q_0}{Q_1 + Q_2 - 2 \cdot Q_0} T_0 + T_{s12} \tag{11}$$

and substituting equations (8), (9), and (10) yields $$t_p = \frac{C_2 \cdot V_2 - C_0 \cdot V_0}{C_1 \cdot V_1 + C_2 \cdot V_2 - 2 \cdot C_0 \cdot V_0} T_0 + T_{s12} \tag{12}$$

Similarly, solving equation (5) for $t_p$ and making the same substitutions yields $$t_p = \left(1 - \frac{C_1 \cdot V_1 - C_0 \cdot V_0}{C_1 \cdot V_1 + C_2 \cdot V_2 - 2 \cdot C_0 \cdot V_0}\right) T_0 + T_{s12} \tag{13}$$

If all three measuring capacitors C0, C1, C2 are assumed to have the same capacitance value (that is $C_0 = C_1 = C_2$) and the reading channels are assumed to have the same gain, the capacitances can be factored out of equation (11) to yield $$t_p = \frac{V_2 - V_0}{V_1 + V_2 - 2 \cdot V_0} T_0 + T_{s12} \tag{14}$$

However, realistically, there may be mismatch between the capacitances of the measuring capacitors and between the gains of the reading channels due to engineering tolerances or temperature variances. If $\alpha_0$, $\alpha_1$, and $\alpha_2$ are multipliers representing the variations, for the respective readout channels, of the conversion factor from charge to voltage (either analog or digital) versus the nominal value, then equation (14) can be rewritten as $$t_p = \frac{\alpha_2 \cdot V_2 - \alpha_0 \cdot V_0}{\alpha_1 \cdot V_1 + \alpha_2 \cdot V_2 - 2 \cdot \alpha_0 \cdot V_0} T_0 + T_{s12} \tag{15}$$

The variation values $\alpha_0$, $\alpha_1$, and $\alpha_2$ are unknown and may be different for each single pixel, and may also vary over temperature. These variations can be compensated for through calibration (e.g., by measuring a, values for each capacitor of each pixel), and by performing correction and compensation.

According to another method, three different measurements (or a number of measurements equal to the number of measuring capacitors being used for each pixel) can be performed, with the roles of the measuring capacitors being changed for each measurement. In an example approach, the roles can be changed using a circular permutation or circular shift. Three sets of voltage values are thereby obtained from the three measurements—($V_0$, $V_1$, $V_2$) triplets—and three different values of $t_p$, can be computed from the three sets of values. Referring to the three measurements as a, b, and c, the three values of $t_p$ are given by $$t_p = \frac{\alpha_2 \cdot V_{2a} - \alpha_0 \cdot V_{0a}}{\alpha_1 \cdot V_{1a} + \alpha_2 \cdot V_{2a} - 2 \cdot \alpha_0 \cdot V_{0a}} T_0 + T_{s12} \tag{16}$$

$$t_p = \frac{\alpha_0 \cdot V_{0b} - \alpha_1 \cdot V_{1b}}{\alpha_2 \cdot V_{2b} + \alpha_0 \cdot V_{0b} - 2 \cdot \alpha_1 \cdot V_{1b}} T_0 + T_{s12} \tag{17}$$

$$t_p = \frac{\alpha_1 \cdot V_{1c} - \alpha_2 \cdot V_{2c}}{\alpha_0 \cdot V_{0c} + \alpha_1 \cdot V_{1c} - 2 \cdot \alpha_2 \cdot V_{2c}} T_0 + T_{s12} \tag{18}$$

Eliminating the three unknown variables $\alpha_0$, $\alpha_1$, and $\alpha_2$, and setting $\alpha$ such that $$\frac{1}{\alpha} = \frac{1}{\alpha_0} + \frac{1}{\alpha_1} + \frac{1}{\alpha_2} \tag{19}$$

yields $$t_p = \frac{\alpha \cdot (V_{2a} + V_{0b} + V_{1c}) - \alpha \cdot (V_{0a} + V_{1b} + V_{2c})}{\alpha \cdot (V_{1a} + V_{2b} + V_{0c}) + \alpha \cdot (V_{2a} + V_{0b} + V_{1c}) - 2 \cdot \alpha \cdot (V_{0a} + V_{1b} + V_{2c})} T_0 + T_{s12} \tag{20}$$

Finally, removing a from numerator and denominator yields $$t_p = \frac{(V_{2a} + V_{0b} + V_{1c}) - (V_{0a} + V_{1b} + V_{2c})}{(V_{1a} + V_{2b} + V_{0c}) + (V_{2a} + V_{0b} + V_{1c}) - 2 \cdot (V_{0a} + V_{1b} + V_{2c})} T_0 + T_{s12} \tag{21}$$

Figure 11:
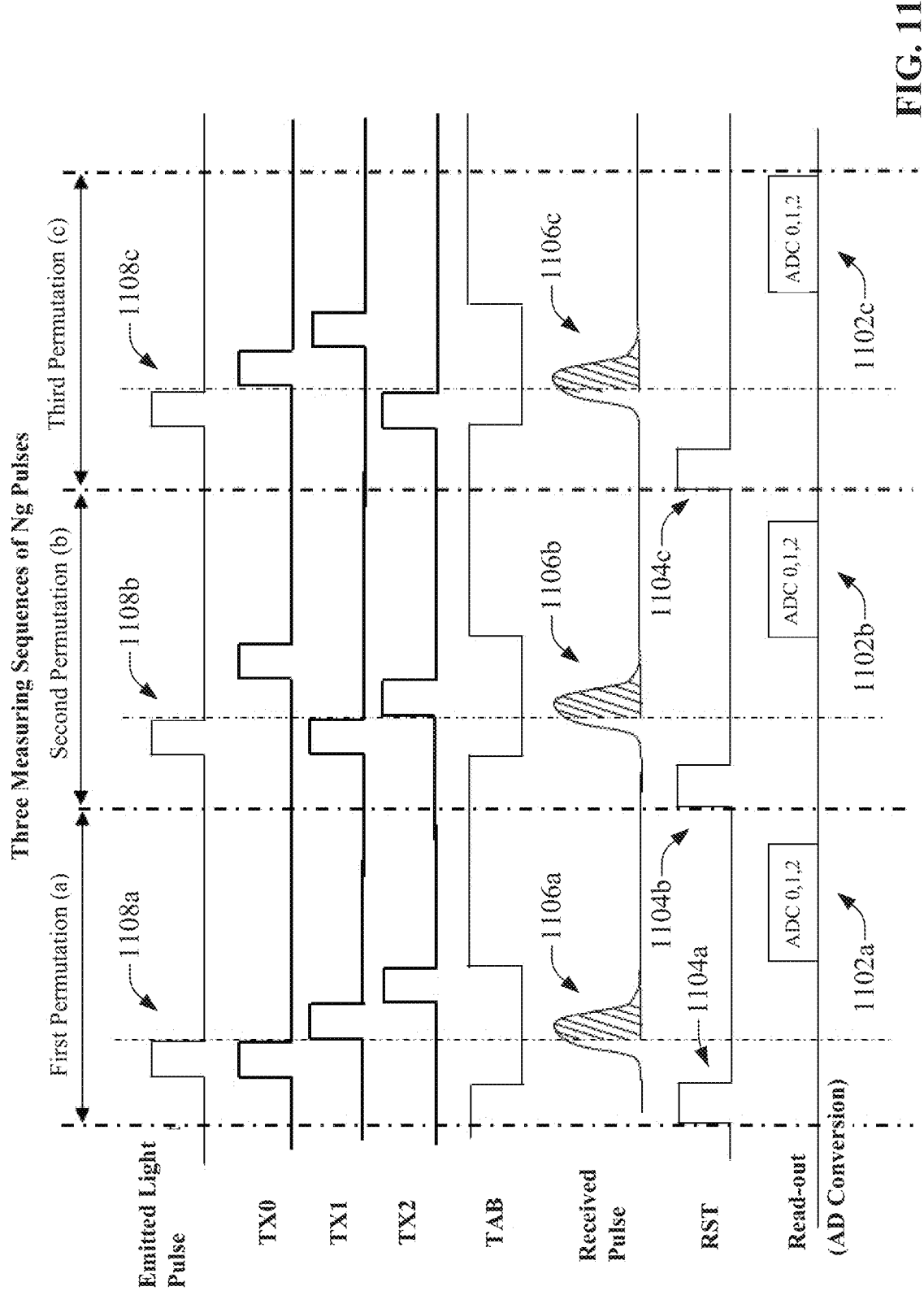
FIG. 11 is a timing diagram illustrating performance of three measuring sequences by an embodiment of a TOF sensor device.

Equation (21) is independent from mismatch and other variations associated with the readout of charge values captured in the measuring capacitors of a given pixel. Thus, to obtain the propagation time in a manner that eliminates the effects of capacitor and reading channel mismatch, embodiments of TOF sensor device 402 can perform three measuring sequences for a given distance measurement operation, with each measuring sequence having the same characteristics except that the roles of the measuring capacitors are changed between measuring sequences by re-ordering the timing of the gating signals. FIG. 11 is a timing diagram illustrating performance of the three measuring sequences by an embodiment of the TOF sensor device 402. In some embodiments, each of the three measuring sequences can comprise a burst sequence in which the pulse period for the present permutation is repeated multiple times without clearing the measuring capacitors using the RST signal 1104, so that measurable amounts of charge are accumulated in the measuring capacitors prior to pulsing the read-out signal 1102.

As shown in FIG. 11, during the first measuring sequence (first permutation (a)), TOF sensor device 402 controls the gating signals according to a first permutation (permutation a), whereby the gating signals are set in the order of [TX0, TX1, TX2]. In the illustrated example, this permutation causes the received pulse 1106a (corresponding to emitted pulse 1108a) to be split between measuring capacitors C0 and C1, with measuring capacitor C2 recording ambient light. When the read-out signal 1102a is pulsed, the voltages stored on measuring capacitors C0, C1, and C2 are read and stored by the photo-sensor component 406 as $V_{0a}$, $V_{1a}$, and $V_{2a}$, respectively.

After completion of the first measuring sequence, the RST signal 1104b is pulsed, causing the charges on the measuring capacitors to be cleared, and the second measuring sequence (second permutation (b)) begins. For the second measuring sequence, the TOF sensor device 402 controls the gating signals according to a second permutation (permutation b), whereby the gating signals are set in the order of [TX1, TX2, TX0]. This ordering of gating signals causes the roles of the measuring capacitors to be shifted relative to the first measuring sequence. The shifting of roles accords to a circular shift, such that gating signal TX0—which was the first gating signal in the first measuring cycle—is reassigned to be the last gating signal, and the other two gating signals TX1 and TX2 are moved forward in time such that TX1 is now the first gating signal and TX2 is now the second gating signal. This ordering of gating signals causes the received pulse 1106b (corresponding to emitted pulse 1108b) to be split between measuring capacitors C1 and C2, with measuring capacitor C0 measuring ambient light. When the read-out signal 1102b is pulsed, the voltages stored on measuring capacitors C0, C1, and C2 are read and stored by the photo-sensor component 406 as $V_{0b}$, $V_{1b}$, and $V_{2b}$, respectively.

After completion of the second measuring sequence, the RST signal 1104c is pulsed, causing the charges on the measuring capacitors to be cleared again, and the third measuring sequence begins. For the third measuring sequence, the gating signals are controlled according to a third permutation (third permutation (c)), whereby the order of the gating signals is again shifted according to a circular shift so that the signals are set in the order of [TX2, TX0, TX1]. This permutation causes the received pulse 1106c (corresponding to emitted pulse 1108c) to be split between measuring capacitors C0 and C2, with measuring capacitor C1 measuring ambient light. When the read-out signal 1102c is pulsed, the voltages stored on measuring capacitors C0, C1, and C2 are read and stored by the photo-sensor component 406 as $V_{0c}$, $V_{1c}$, and $V_{2c}$, respectively.

Since the present example assumes a pixel architecture that uses three measuring capacitors (e.g., the architecture illustrated in FIG. 5), the distance determination component 408 calculates the time of flight after completion of the three measuring sequences using equation (21) (or a variation of that equation). In general, TOF sensor device 402 will execute a number of measuring sequences equal to the number of measuring capacitors used in the photo-detector for each pixel, and distance determination component 408 can determine the time of flight using a suitable variation of equation (21) (derived using the techniques described above) that accommodates the resulting number of measured voltage sets.

The example illustrated in FIG. 11 uses a circular shifting approach to vary the roles of the measuring capacitors between permutations. That is, the gating signals TX0, TX1, and TX2 are triggered in sequential numerical order for each permutation, with the first permutation beginning with TX0, the second permutation beginning with TX1, and the third permutation beginning with TX2, and with the sequence looping back to TX0 after TX2 when appropriate. However, other approaches for varying the roles of the measuring capacitors between measuring sequences are also within the scope of one or more embodiments.

This multi-measurement technique can produce accurate time of flight measurements—and corresponding pixel-wise distance calculations—in a manner that accounts for variations and mismatches between capacitance values of the measuring capacitors and associated channels without the need to measure these mismatches and perform calibrations to compensate for the mismatches as part of the distance measurement processing.

In some embodiments, TOF sensor device 402 may be an industrial safety device configured to serve as a sensor for an industrial safety system. In such implementations, the control output component 412 can be configured to generate a safety output in response to a determination that the distance value calculated by distance determination component 408 satisfies a defined criterion. In an example scenario, TOF sensor device 402 may be configured to monitor an area surrounding a hazardous industrial machine or automation system to ensure that people or objects (e.g., vehicles such as fork lifts) do not approach the hazardous area within a defined minimum safe distance. Accordingly, control output component 412 can be configured to generate a safety output in response to determining that the distance measured and calculated by the distance determination component 408 is less than the defined minimum safe distance. In some applications, the hazardous area may be defined as a distance range that begins a first distance away from the TOF sensor device 402 and ends at a second, longer distance area from the TOF sensor device. In such applications, the control output component 412 may be configured to generate the safety output signal in response to determining that the measured distance is within this distance band defined by the first and second distances.

The action initiated by the safety output signal can depend on the type of safety application within which the TOF sensor device 402 is being used. In various non-limiting examples, the safety output signal generated by control output component 412 may be configured to disconnect power from the monitored automation system or machine, place the system or machine in a safe mode (e.g., a slow operation mode), send a notification to one or more client devices to alert personnel that a person or object has been detected within the hazardous area, or perform other such safety actions.

Figure 12:
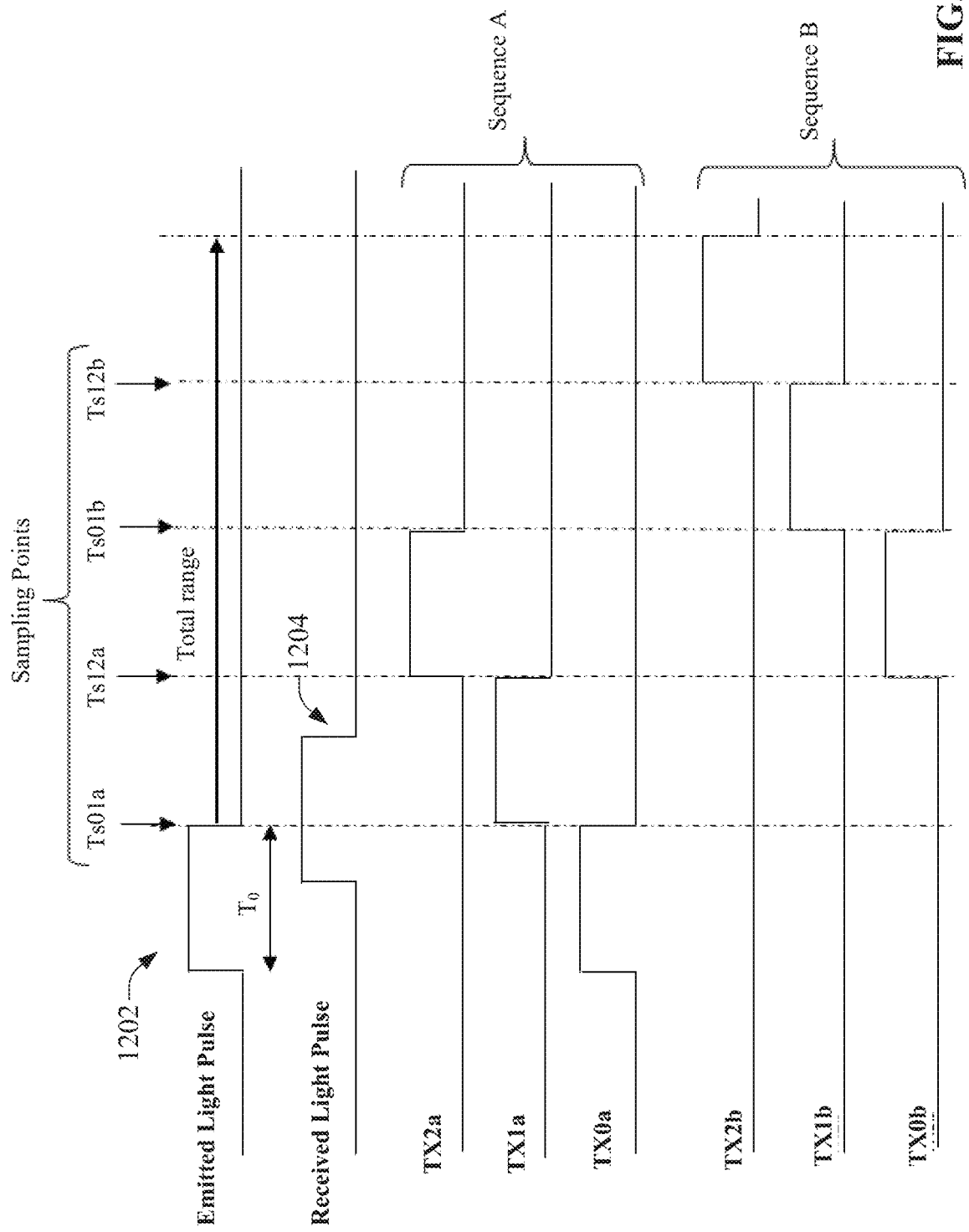
FIG. 12 is a timing diagram illustrating a measuring sequence that combines multiple gating sequences within a single measuring sequence in order to increase the total detection range.

In the example described above in connection with FIG. 11, for each of the three measuring sequences, the three gating signals TX0, TX1, and TX2 are pulsed only once for each of the Ng pulses emitted within that sequence (with the order of the three gating signals changed for each measuring sequence). This yields the two sampling times Ts01 and Ts12 as described above, which facilitates detection of objects within a certain distance range. Other embodiments of TOF sensor device 402 can increase the distance detection range and/or distance measurement precision by performing and combining multiple gating signal sequences for each of the Ng pulses of each measuring sequence. FIG. 12 is a timing diagram illustrating a measuring sequence that combines multiple gating sequences within a single measuring sequence in order to increase the total detection range. In this example, for a given measuring sequence, two pulse periods with two different gating signal timings are performed. The two gating signal sequences are referred to herein as sequence A and sequence B, as indicated in FIG. 12.

For each of the two gating sequences, a light pulse 1202 is emitted, a corresponding reflected pulse 1204 is received, and photo-sensor component 406 cycles through gating signals TX0, TX1, and TX2 as described in previous examples. For the first instance of emitted pulse 1202 (sequence A), the gating signals are cycled as indicated by sequence A in FIG. 11 (the TX0a, TX1a, and TX2a timing charts represent the timing of gating signals TX0, TX1, and TX2, respectively, for sequence A). This sequence is similar to that described in previous examples, in which the gating signals are set high sequentially, each for a gating duration of Tw, resulting in two sampling points Ts01a (at the transition between TX0a and TX1a) and Ts12a (at the transition between TX1a and TX2a).

Upon completion of sequence A, the voltages (or charges) stored on the three measuring capacitors are read and stored as results of the first measuring sequence, the measuring capacitors are cleared, emitter component 404 emits another light pulse 1202, and photo-sensor component 406 cycles the gating signals again, this time in accordance with the timing indicated by sequence B in FIG. 12 (the TX0b, TX1b, and TX2b timing charts represent the timings of gating signals TX0, TX1, and TX2, respectively, for sequence B). As shown in FIG. 12, the sequence B gating signal timing is similar to that of sequence A (and previous examples), but is delayed relative to the sequence A timing. That is, the first gating signal in sequence B is set high at a later time relative to the start of the pulse period than sequence A. The sequence B gating signal timings yield two additional sampling points at Ts01b (at the transition between TX0b and TX1b) and Ts12b (at the transition between TX1b and TX2b).

In this example, the timing of gating sequence B is set such that the first gating signal (TX0b) is initiated at the same time, within the pulse period, at which the third gating signal of sequence A (TX2a) was initiated. This timing causes the TX0b and TX2a gating signals to have the same start and stop times relative to the start of the pulse period. Controlling the gating signals such that sequence A and sequence B overlap in this manner yields four sampling points—Ts01a, Ts12a, Ts01b, and Ts12b—that are separated from each other by a duration of pulse width Tw. At the end of sequence B, the voltages (or charges) accumulated on the measuring capacitors are again read and stored.

In the example illustrated in FIG. 12, the reflected pulse 1204 received by the photo-sensor component 406 is split at sampling points Ts01a. Thus, in this scenario, the voltage $V_0$ measured from capacitor C0 upon completion of sequence A corresponds to the leading edge plus ambient light, voltage $V_1$ measured from capacitor C1 upon completion of sequence A corresponds to the trailing edge plus ambient light, and voltage $V_2$ measured from capacitor C2 upon completion of sequence A corresponds to ambient light only. Moreover, all of voltages $V_0$, $V_1$, and $V_2$ measured from capacitors C0, C1, and C2, respectively, upon completion of sequence B are representative only of ambient light, since the received pulse 1204 was not spit or sampled during sequence B due to the relatively close proximity of the object to the TOF sensor device.

After completion of both sequences A and B, the distance determination component 408 can make a determination as to which of the voltages—sequence A $V_0$, sequence A $V_1$, sequence A $V_2$, sequence B $V_0$, sequence B $V_1$, or sequence B $V_2$—correspond to the leading and trailing edges (if there is no object in the portion of the viewing field associated with the photo-detector, the voltage measurements will only report ambient light; accordingly, if all of the measured voltages are below a defined threshold indicative of the absence of a pulse, the photo-detector assumes that no object is present and bypasses the distance calculation for the present measuring sequence). If the sampling point is Ts01a or Ts12b, all but two of these voltages will be expected correspond to ambient light only, and so distance determination component 408 can identify the leading and trailing edge voltages by identifying the two voltages that are greater than the other four voltages (which will be approximately equal to one another). If these two voltages are sequence A voltages, the distance can be calculated based on equation (14) using the three voltages measured and recorded from sequence A. Alternatively, if the leading and trailing edge voltages are sequence B voltages, the distance can be calculated based on equation (14) using the three voltages measured and recorded from sequence B (replacing sampling time Ts12 in that equation with the appropriate sampling time Ts01a, Ts12a, Ts01b, or Ts12b determined to have split the received pulse). The correct sampling time can also be identified by applying equations (2) and (3) to the measured voltages for each sequence.

If the sampling point is Ts12a, the leading edge voltage will be V 1 of sequence A, while the trailing edge voltage will be correspond to both $V_2$ of sequence A and $V_0$ of sequence B since the reflected pulse is received within the overlap area between sequence A and sequence B. Similarly, if the sampling point is Ts01b, the leading edge voltage will be both $V_2$ of sequence A and $V_0$ of sequence B, while the trailing edge voltage will be $V_1$ of sequence B only. Accordingly, if the distance determination component 408 determines that $V_2$ of sequence A and $V_0$ of sequence B are equal to one another and also greater than the voltages corresponding to ambient light only, it is assumed that the sampling point is either Ts12a or Ts01b. To identify which of the two sampling points is correct, the distance determination component 408 can then determine which of sequence A $V_1$ or sequence B $V_1$ is the higher voltage. If sequence A $V_1$ is higher than sequence B $V_1$, then the sampling point is assumed to be Ts12a, and the distance is calculated based on equation (14) using the sequence A voltages. Alternatively, if sequence B $V_1$ is higher than sequence A $V_1$, the sampling point is assumed to be Ts01b, and the distance is calculated based on equation (14) using the sequence B voltages.

By increasing the number of possible sampling points using two or more offset iterations of the gating signals as illustrated in FIG. 12, the total sensing distance of the TOF sensor device 402 can be increased relative to embodiments that use a fixed timing for the gating signals. As illustrated in FIG. 12, reflected pulse 1204 will be detected provided the pulse is split by any of the four sampling points Ts01a, Ts12a, Ts01b, or Ts12b, resulting in a total measurable time of flight range of four times the pulse width $T_0$ (or four times the gating signal duration Tw in the scenario illustrated in FIG. 12).

This technique for increasing the measurable distance of TOF sensor device 402 can be performed for any TOF sensor that uses three measuring capacitors for each pixel, regardless of whether the TOF sensor implements permutation of measuring capacitors as described above in connection with FIG. 11. That is, if permutation of measuring capacitors across multiple measuring sequences is not implemented, multiple offset gating signal sequences as illustrated in FIG. 12 can still be used to increase the distance. If permutation of measuring capacitors across multiple measuring sequences is implemented (as illustrated in FIG. 11), multiple offset gating signals may also be used in conjunction with permutation of measuring capacitors in some embodiments. In such embodiments, each measuring sequence illustrated in FIG. 11 may employ multiple offset gating signal sequences per permutation in order to both increase the measurable distance and to account for mismatch between the measuring capacitors and read-out channels.

Figure 13:
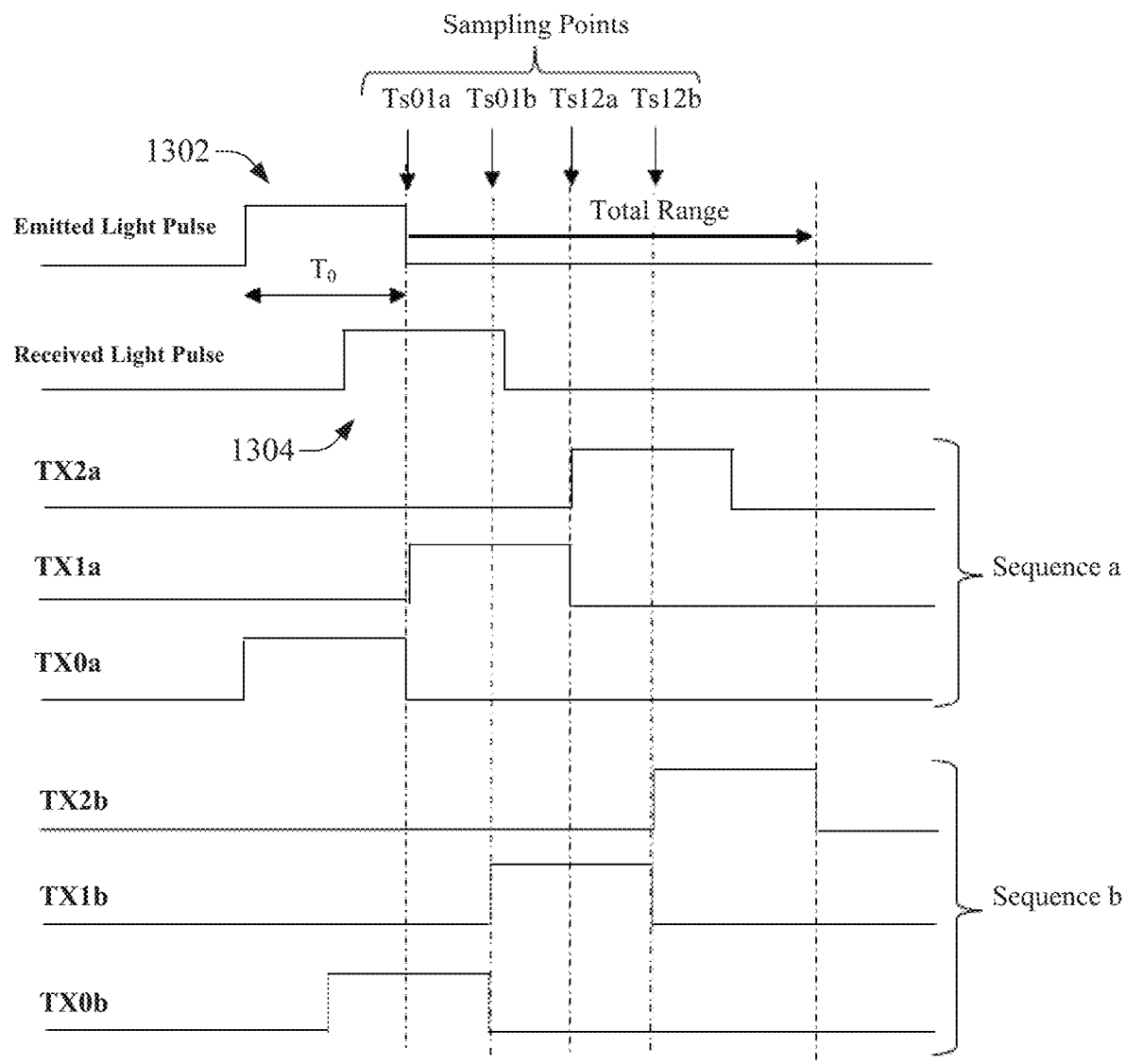
FIG. 13 is a timing diagram illustrating a measuring sequence that combines multiple offset gating sequences within a single measuring sequence in a manner that increases both the total detection range and precision of the distance measurement.

FIG. 13 is another example timing diagram illustrating a measuring sequence that combines multiple offset gating sequences within a single measuring sequence in a manner that increases both the total detection range and precision of the distance measurement. Similar to the example timing depicted in FIG. 12, the measuring sequence comprises two pulse periods in which, for each pulse period, a light pulse 1302 is emitted, a corresponding reflected pulse 1304 is received, and gating signals TX0, TX1, and TX2 are cycled. Also similar to the example depicted in FIG. 12, gating sequence B of the second pulse period is offset in time relative gating sequence A of the first pulse period. However, in this example, the offset between sequence A and sequence B is smaller than that of FIG. 12. Specifically, whereas gating sequence B was offset by twice the gating signal duration Tw in FIG. 12, in the present example gating sequence B is offset only by half of Tw. This timing yields four sampling points Ts01a, Ts12a, Ts01b, and Ts12b that are separated only by Tw/2 (half of Tw).

Although this smaller offset between gating signal sequences results in a smaller measurable distance relative to the larger offset illustrated in FIG. 12, setting the duration between sampling points to be less than the pulse width can produce a more precise distance measurement. This increased precision is obtained because, in contrast to the scenario depicted in FIG. 12, the reflected pulse 1304 may be detected by both gating signal sequences, producing two sets of voltages $V_0$, $V_1$, and $V_2$ that can be used for distance calculations. For example, during sequence A of the measuring cycle, reflected pulse 1304 is split at sampling point TS01a, such that sequence A voltage $V_0$ represents the Ts01a leading edge plus ambient light, sequence A voltage $V_1$ represents the Ts01a trailing edge plus ambient light, and sequence A voltage $V_2$ represents ambient light only. During subsequent sequence B, reflected pulse 1304 is split by Ts01b at a different point on the reflected pulse 1304 relative to sequence A, such that sequence B voltage $V_0$ represents the Ts01b leading edge plus ambient light, sequence b voltage $V_1$ represents the Ts01b trailing edge plus ambient light, and sequence B voltage $V_2$ represents ambient light only.

In contrast to the scenario depicted in FIG. 12, in which only one of sequence A or sequence B detects the reflected pulse and therefore only a single set of voltages $V_0$, $V_1$, and $V_2$ can be used to compute propagation time and distance, the reflected pulse 1304 is detected by both sequence A and sequence B. Thus, measuring and storing voltages $V_0$, $V_1$, and $V_2$ at the end of each of the two sequences A and B yields two different sets of voltages $V_0$, $V_1$, and $V_2$ that can each be used to compute propagation time and distance. Sequences A and B sample the pulse 1304 at different locations along the pulse 1304, and therefore yield different values of $V_0$, $V_1$, and $V_2$ for the same propagation time. These two different sets of $V_0$, $V_1$, and $V_2$ can therefore be used by distance determination component 408 to calculate respective two different values for the propagation time, which can then be compared or combined to yield a final propagation time from which the distance can be calculated.

Distance determination component 408 can use any suitable technique to combine the two sets of voltages to produce a final propagation time value. In an example implementation, assuming that the sequence A and sequence B voltages are given by $[V_0, V_1, V_2]A$ and $[V_0, V_1, V_2]B$, respectively, distance determination component 408 may compute two different propagation times $t_pA$ and $t_pB$ using the respective to voltage sets (e.g., based on equation (14)), and average the two propagation times to yield a final propagation time from which the distance is calculated (e.g., using equation (1)). Alternatively, distance determination component 408 may select one of the propagation times $t_{pA}$ or $t_{pB}$ based on a selection criterion and use the selected propagation time to compute the distance. For embodiments in which control output component 412 is configured to trigger a safety output in response to detection of objects within a defined distance of the sensor device, the distance determination component 408 may be configured to select the smaller propagation time (corresponding to the shortest distance) to ensure that the safety output is reliably triggered with the lowest possible latency. Other techniques for combining the two propagation times $t_{pA}$ and $t_{pB}$ are also within the scope of this disclosure.

Although the examples depicted in FIGS. 12 and 13 depict only two gating signal sequences per measuring cycle, some embodiments may implement more than two offset gating signal sequences in order to further increase the measurable distance. Also, although the foregoing examples only discuss gating signal offsets of 2Tw and Tw/2, other offset times are also within the scope of one or more embodiments.

FIGS. 14A-15B illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

Figure 14A:
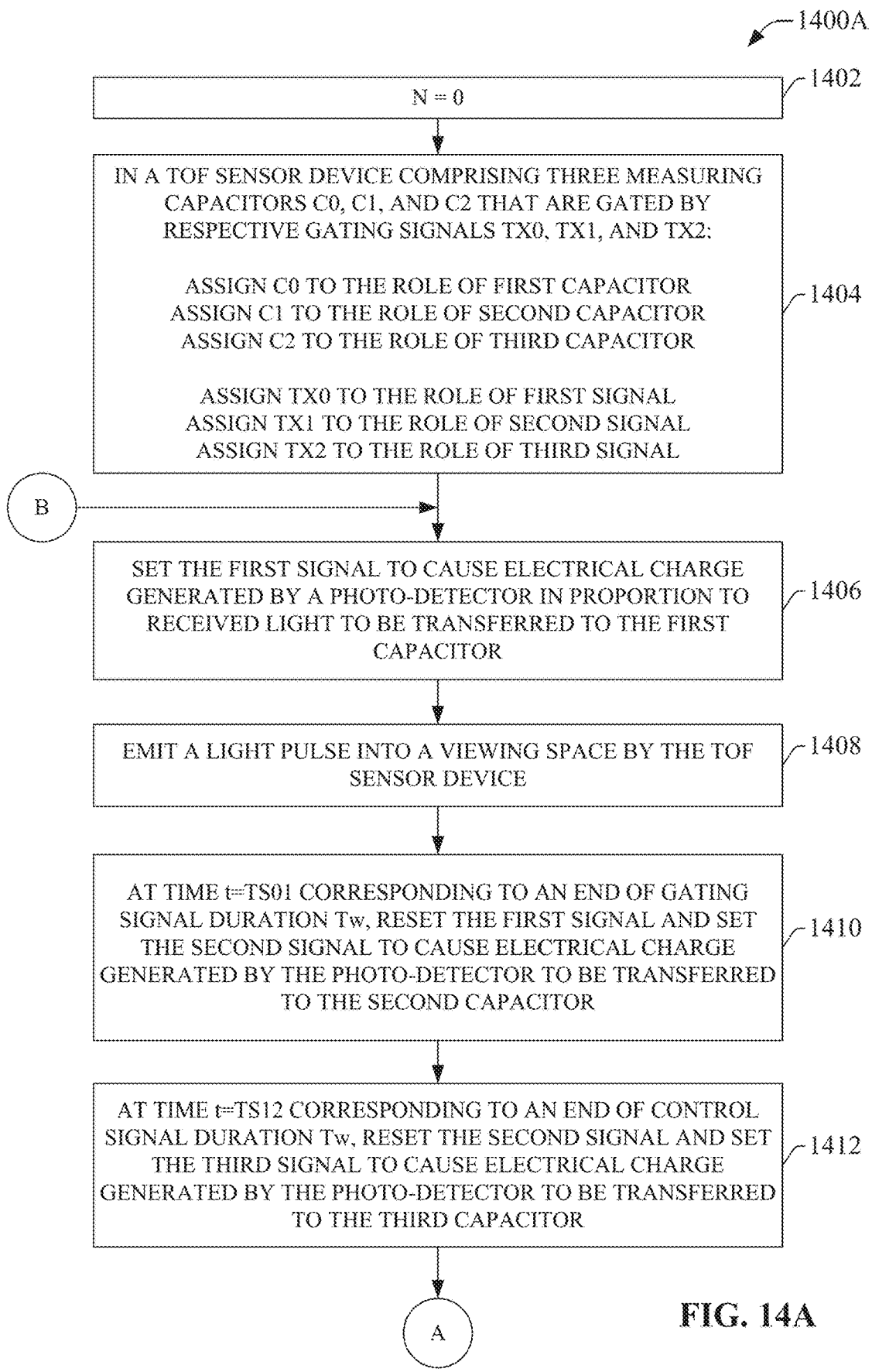
FIG. 14A is a flowchart of a first part of an example methodology for determining a distance of an object or surface corresponding to a pixel of a TOF sensor image.

FIG. 14A illustrates a first part of an example methodology 1400A for determining a distance of an object or surface corresponding to a pixel of a TOF sensor image. The methodology illustrated in FIGS. 14A-14C may be suitable for execution on a TOF sensor device having an array of three-capacitor photo-detectors as illustrated in FIG. 5. However, the general methodology can be applied to TOF sensor devices having an array of two-capacitor photo-detectors, or may be expanded to accommodate TOF sensor devices having photo-detectors that employ more than three measuring capacitors in order to accumulate time-of-flight information for an emitted light pulse more quickly relative to single-capacitor sensor devices.

Initially, at 1402, an integer variable N is set equal to 0. Integer N tracks the number of measuring sequences performed by the TOF sensor device. For the example three-capacitor embodiment, three measuring sequences will be executed to obtain a single distance measurement, and so the measuring sequence will be executed for N=0 to 2.

At 1404, for the three-capacitor TOF sensor device in which each photo-detector of the TOF sensor device's pixel array comprises three measuring capacitors C0, C1, and C2 which are respectively gated by three corresponding gating signals TX0, TX1, and TX2, measuring capacitor C0 is assigned the role of first capacitor, capacitor C1 is assigned the role of second capacitor, and capacitor C2 is assigned the role of third capacitor. Likewise, gating signal TX0 (corresponding to capacitor C0) is assigned the role of first signal, gating signal TX1 (corresponding to capacitor C1) is assigned the role of second signal, and gating signal TX2 (corresponding to capacitor C2) is assigned the role of third signal. These role designations determine the order in which the gating signals are triggered in the present $N^{th}$ measuring sequence, and consequently the order in which the measuring capacitors receive charge from the TOF sensor device's photo device.

At 1406, the first signal designated at step 1404 is set, causing electrical charge generated by the photo-detector in proportion to received light to be transferred to the first capacitor (also designated at step 1404). At 1408, a light pulse is emitted into the viewing space by the TOF sensor device. Emission of the light pulse can be timed such that the falling edge of the light pulse corresponds to the falling edge of the first gating signal (see step 1410 below).

At 1410, at a time t=Ts01 corresponding to an end of a gating signal duration Tw measured from the time that the first gating signal was set at step 1406, the first signal is reset, causing charges to cease transferring to the first capacitor. At the same time or approximately the same time, the second signal is set, causing electrical charge generated by the photo-detector to begin transferring to the second capacitor. At 1412, at a time t=Ts12 corresponding to the end of the gating signal duration Tw measured from the time that the second signal was set at step 1410, the second signal is reset, causing charges to cease transferring to the second capacitor. At the same time or approximately the same time, the third signal is set, causing electrical charge generated by the photo-detector to begin transferring to the third capacitor.

Figure 14B:
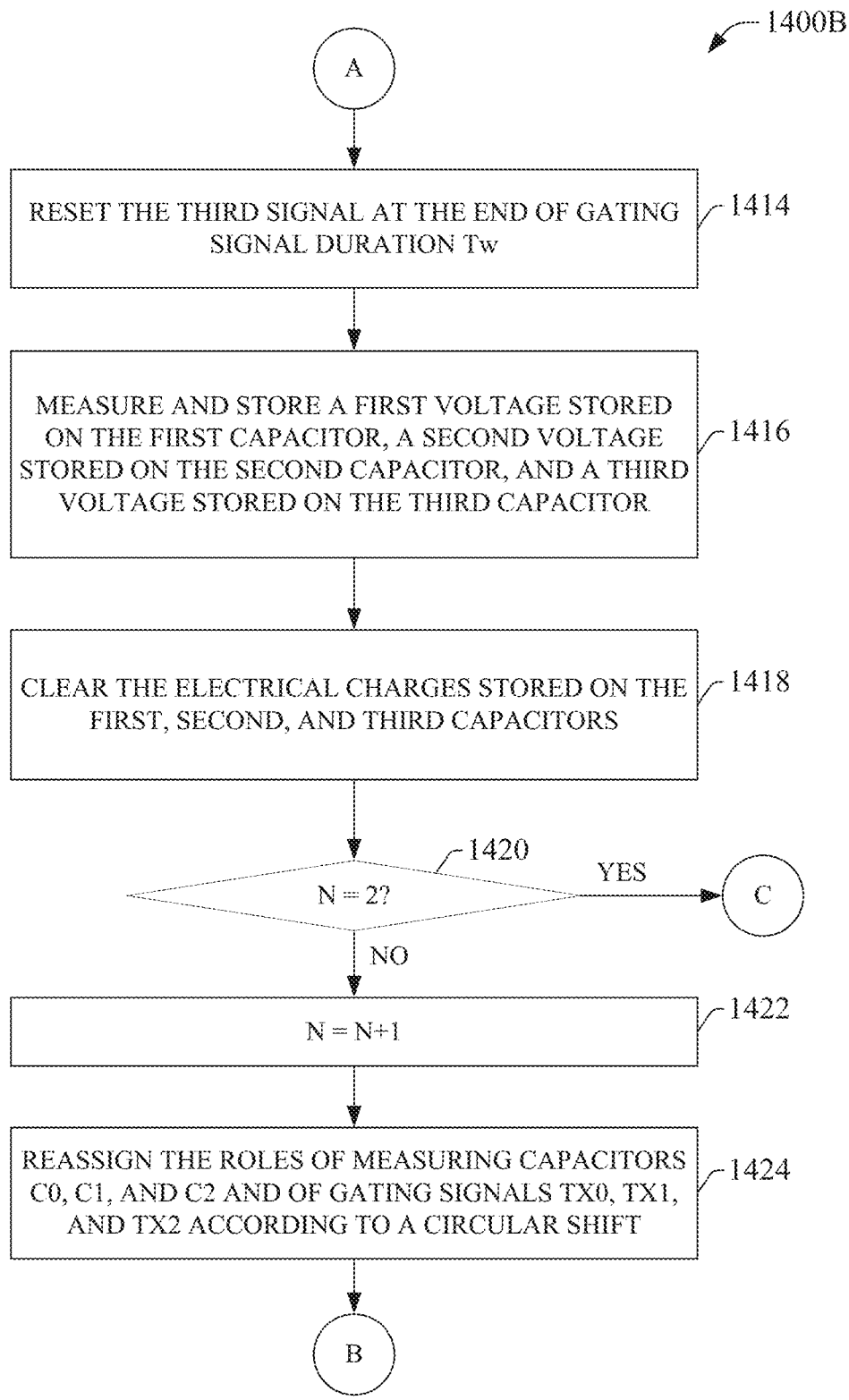
FIG. 14B is a flowchart of a second part of the example methodology for determining a distance of an object or surface corresponding to a pixel of a TOF sensor image.
Figure 14C:
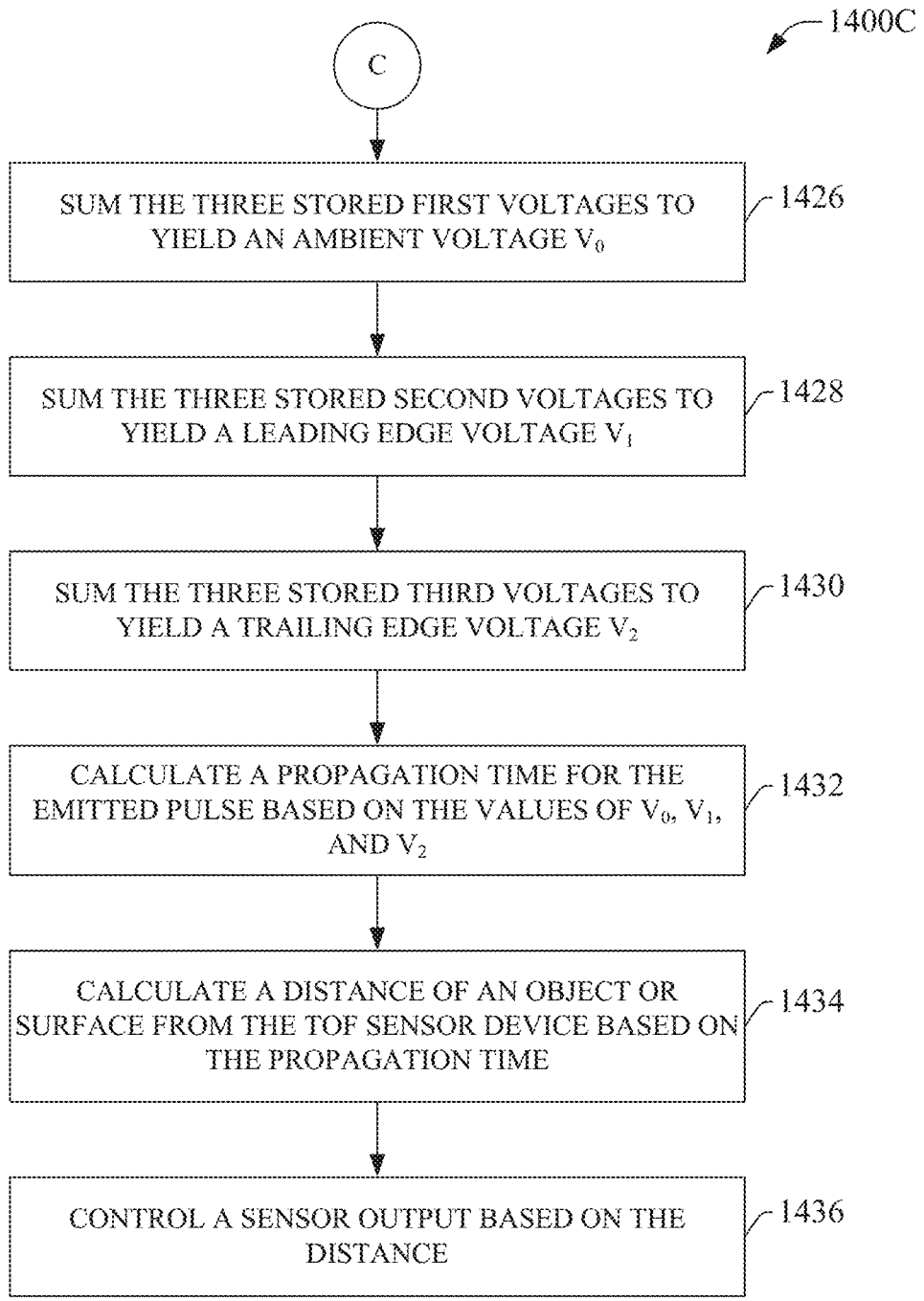
FIG. 14C is a flowchart of a third part of the example methodology for determining a distance of an object or surface corresponding to a pixel of a TOF sensor image.

The methodology continues with the second part 1400b illustrated in FIG. 14B. At 1414, the third signal is reset at the end of the gating duration Tw measured from the time that the third signal was set at step 1412. At 1416, a first voltage stored on the first capacitor as a result of the charges accumulated while the first gating signal was set is measured and stored. Similarly, second and third voltages respectively stored on the second and third capacitors as a result of the charges accumulated while the second and third signals were set are measured and stored. In some embodiments, the voltages can be measured from the respective measuring capacitors as analog voltages (e.g., by one or more amplifiers) and converted to digital values by one or more ADCs. At 1418, the electrical charges stored on the first, second, and third capacitors are cleared. Measurement and storage of the first, second, and third voltages completes the current measuring sequence.

Although the methodology depicts steps 1406-1414 as executing only once during the Nth measuring sequence before the measuring capacitor voltages are measured at step 1416, in some embodiments the Nth measuring sequence may be a burst sequence in which steps 1406-1414 are repeated multiple times with the current measuring capacitor and gating signal role designations so that a measurable amount of charge is accumulated on each of capacitors C0, C1, and C2.

After clearing the measuring capacitor charges at step 1418, a determination is made at step 1420 as to whether N is equal to 2, indicating that three measuring sequences have been completed. If N is equal to 2 (YES at step 1420), the methodology proceeds to the third part 1400C, to be discussed below. Alternatively, if N does not equal 2 (NO at step 1420), the methodology proceeds to step 1422, where N is incremented by one, representing the next measuring sequence. At 1424, the roles of the measuring capacitors C0, C1, and C2, as well as the roles of the gating signals TX0, TX1, and TX2, are reassigned. In some embodiments, the role reassignment can accord to a circular shift. For example, after completion of the first measuring sequence (N=0) in which the roles are assigned according to step 1404, the second measuring sequence (N=1) performs a circular shift of the roles, such that C1 and TX1 are assigned the roles of first capacitor and first signal, respectively; C2 and TX2 are assigned the roles of second capacitor and second signal, respectively; and C0 and TX0 are assigned the roles of third capacitor and third signal, respectively. For the third measuring sequence (N=2), the roles are again shifted at step 1424, such that C2 and TX2 are assigned the roles of first capacitor and first signal, respectively; C0 and TX0 are assigned the roles of second capacitor and second signal, respectively; and C1 and TX1 are assigned the roles of third capacitor and third signal, respectively. The circular shifting of the roles can be performed in either direction. Although the illustrated methodology assumes a circular shift, other approaches for varying the roles of the capacitors and gating signals between measuring sequences can be used without departing from the scope of one or more embodiments, provided each of the measuring capacitors is only assigned to a given role once for a given distance measurement operation.

After reassignment of the roles at step 1424, the methodology returns to step 1406, and steps 1406-1418 are repeated using the new role assignments in order to obtain another set of values of the first voltage, the second voltage, and the third voltage. Since the roles have been reassigned relative to the previous measuring sequence, the first, second and third voltages will be measured from different measuring capacitors relative to the previous measuring sequence.

Reassignment of roles at step via circular shift at step 1424 and execution of the measuring sequence at steps 1406-1418 using the new roles are repeated until three measuring sequences have been completed (N is equal to 2 at step 1420). In general, the number of measuring sequences to be completed is equal to the number of measuring capacitors used in the photo-detector. When N is determined to be equal to 2 at step 1420, the three iterations of the measuring sequence will have produced three sets of first, second, and third voltages.

In the present example, it is assumed that the received pulse corresponding to the pulse emitted at step 1408 is received at the photo-detector at a time that causes the pulse to be split at time t=Ts12. When N is determined to be equal to 2 (YES at step 1420), the methodology continues to the third part 1400C illustrated in FIG. 14C. At 1426, the three stored first voltages obtained via multiple iterations of step 1416 are summed to yield an ambient voltage $V_0$. Voltage $V_0$ is proportional to the total amount of ambient light incident on the photo-detector over the three measuring sequences, as collected by the three measuring capacitors C0, C1, and C2 while those capacitors were assigned the role of first capacitor. At 1428, the three stored second voltages are summed to yield a leading edge voltage $V_1$, which is proportional to the total of the leading edge portions of the reflected pulses, plus ambient light, received during the three measuring sequences, as collected by measuring capacitors C0, C1, and C2 while those capacitors were assigned the role of second capacitor. At 1430, the three stored third voltages are summed to yield a trailing edge voltage $V_2$, which is proportional to the total of the trailing edge portions of the reflected pulses, plus ambient light, received during the three measuring sequences, as collected by measuring capacitors C0, C1, and C2 while those capacitors were assigned the role of third capacitor. By rotating the measurement roles (ambient, leading edge, and trailing edge) between the three measuring capacitors C0, C1, and C2 across corresponding three measuring sequences and adding the like measurements for the three sequences, the time of flight calculation will compensate for capacitance mismatches between the measuring capacitors without requiring knowledge of the mismatches and without the need to calibrate the sensor.

For scenarios in which the received pulse is received at a time that causes the pulse to be split at time t=Ts01, steps 1426-1430 are modified such that the sum of the three stored first voltages will yield the leading edge voltage, the sum of the three stored second voltages will yield the trailing edge voltage, and the sum of the three stored third voltages will yield the ambient voltage.

At 1432, a propagation time for the emitted light pulse—that is, the time between emission of the pulse and receipt of the pulse at the photo-detector—is calculated based on the measured and calculated values of $V_0$, $V_1$, $V_2$ obtained at steps 1426-1430 above. For example, the propagation time $t_p$ can be determined by the TOF sensor device's distance determination component 408 based on equation (14) (or a reasonable variation thereof) using the summed voltages $V_0$, $V_1$, $V_2$, the width of the emitted light pulse $T_0$, and the time Ts12 of the sampling point measured relative to the falling edge of the emitted pulse (note that equation (21) represents a rewritten version of equation (14) showing the sums of the measured voltages). In general, distance determination component 408 can determine the propagation time $t_p$ by subtracting the summed ambient light voltage $V_0$ from both the summed leading edge (plus ambient light) voltage $V_1$ and the summed trailing edge (plus ambient light) voltage $V_2$ to obtain summed voltages proportional to the leading and trailing edges, respectively, of the received reflected pulse. Distance determination component 408 can then determine the ratio of the resulting summed leading edge voltage (without ambient light) to the total of the summed leading and trailing edge voltages (also without ambient light), multiply this ratio by the total time duration $T_0$ of the received light pulse, and add the sampling point time Ts12 to this product to obtain the propagation time tp.

At 1434, a distance of an object or surface from the TOF sensor device is calculated based on the propagation time $t_p$ calculated at step 1432 (e.g., using equation (1)). At 1436, a sensor output is controlled based at least in part on the distance calculated at step 1434. For example, in the case of a TOF sensor device used as an industrial safety sensor, the sensor output may be a safety output signal triggered in response to a determination that the distance is less than a defined minimum safe distance.

As noted above, while the general methodology described above in connection with FIGS. 14A-14C assumes a three-capacitor photo-detector, the methodology can be modified to accommodate photo-detectors that employ other numbers of measuring capacitors (e.g., two capacitors, four capacitors, etc.). In such implementations, the roles of the respective measuring capacitors, regardless of the number of capacitors, are reassigned between measuring sequences of a given distance measurement operation.

Figure 15A:
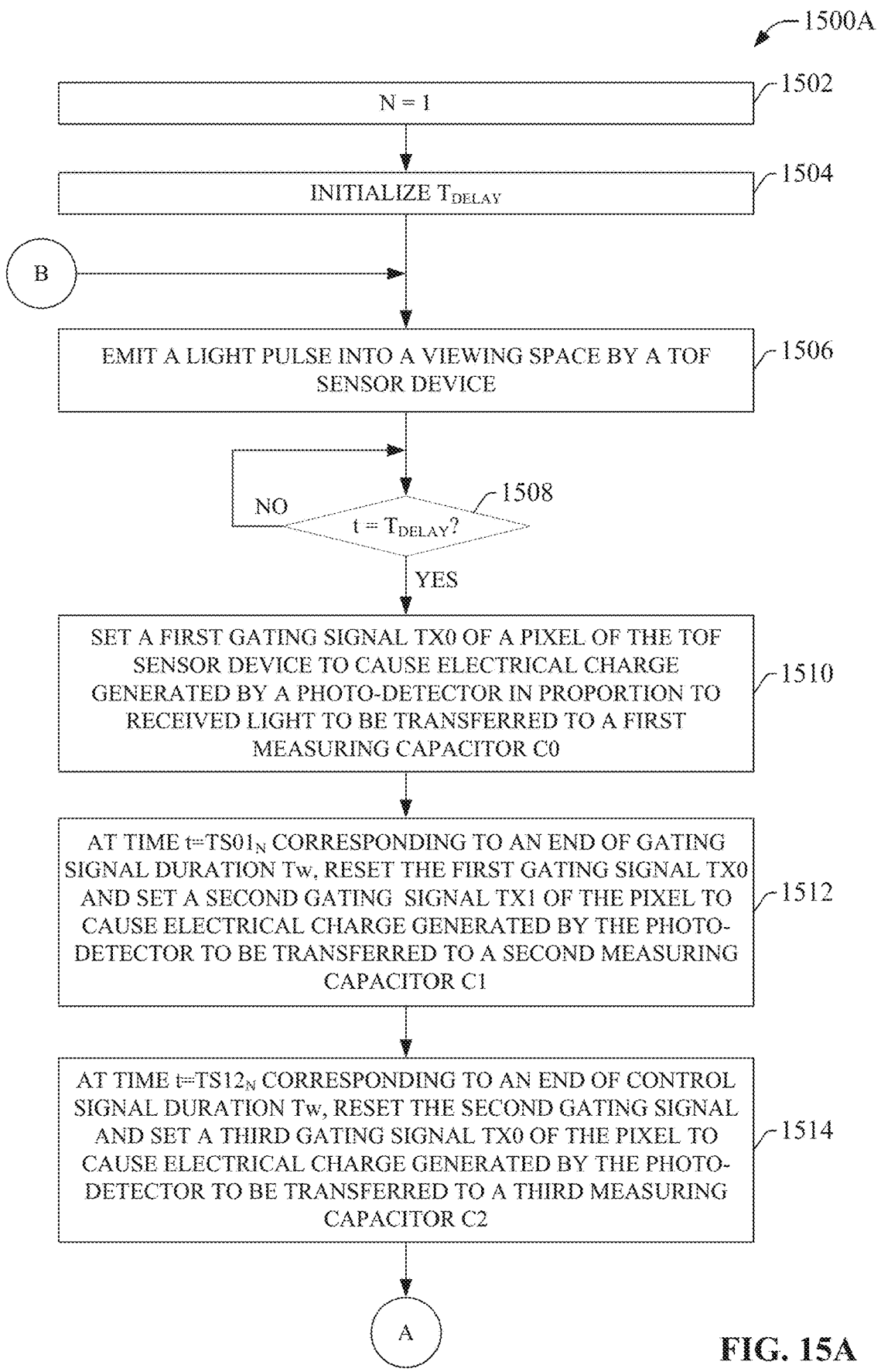
FIG. 15A is a flowchart of a first part of an example methodology for determining a distance of an object or surface corresponding to a pixel of a TOF sensor image.

FIG. 15A illustrates a first part of an example methodology 1500A for determining a distance of an object or surface corresponding to a pixel of a TOF sensor image. The methodology illustrated in FIGS. 15A-15C may be suitable for execution on a TOF sensor device having an array of three-capacitor photo-detectors as illustrated in FIG. 5, and can be employed to increase the distance range within which the TOF sensor device can accurately measure a distance of an object or surface. In some embodiments, the methodology illustrated in FIGS. 15A-15C can be combined with the methodology described above in connection with FIGS. 14A-14C for executing multiple measuring sequences that permutate the roles of the measuring capacitors. However, the methodology of FIGS. 15A-15C may also be used independently of the methodology of FIGS. 14A-14C without permutating the roles of the measuring capacitors over multiple measuring sequences.

Initially, at 1502, a gating sequence tracking variable N is set equal to 1, representing the first gating sequence. At 1504, a delay time $T_{DELAY}$ is initialized. Delay time $T_{DELAY}$ represents a delay time between the start of the present pulse period and initiation of the gating sequence. As will be described below, this delay time $T_{DELAY}$ is offset for each measuring sequence.

At 1506, a light pulse is emitted into a viewing space by the TOF sensor device at time t=0. At 1508, a determination is made as to whether the current time t is equal to $T_{DELAY}$. If t does not equal $T_{DELAY}$ (NO at step 1508), the methodology waits until t is equal to $T_{DELAY}$ (YES at step 1508), then proceeds to step 1510. Although the present example assumes that initialized $T_{DELAY}$ is greater than zero (that is, $T_{DELAY}$ occurs after the light pulse is emitted at time t=0), in some embodiments initialized $T_{DELAY}$ may be less than zero, such that the first iteration of the gating signals described below begins before the light pulse is emitted.

At 1510, a first gating signal TX0 of a pixel of the TOF sensor device is set, causing electrical charge generated by a photo-detector in proportion to received light to be transferred to a first measuring capacitor C0 of the pixel's photo-detector. At 1512, at time t=Ts01$_N$ corresponding to an end of a gating signal duration Tw (measured relative to the start of the first gating signal TX0 at step 1510, such that t=Ts01$_N$=T$_{DELAY}$ Tw), the first gating signal TX0 is reset, ending transfer of charges to the first measuring capacitor C0. At the same time or approximately the same time, a second gating signal TX1 is set, causing the electrical charge generated by the photo-detector to begin transferring to a second measuring capacitor C1.

At 1514, at a time t=Ts12$_N$ corresponding to an end of the gating signal duration Tw (measured relative to the start of the second gating signal TX1 at step 1512, such that t=Ts12$_N$=T$_{DELAY}$ 2Tw), the second gating signal TX1 is reset, ending transfer of charges to the second measuring capacitor C1. At the same time or approximately the same time, a third gating signal TX2 is set, causing the electrical charge generated by the photo-detector to begin transferring to a third measuring capacitor C2. Although gating signal duration Tw is assumed to be constant across all measuring sequences in the present example, in some embodiments Tw may be a function of the sequence tracking integer N.

Figure 15B:
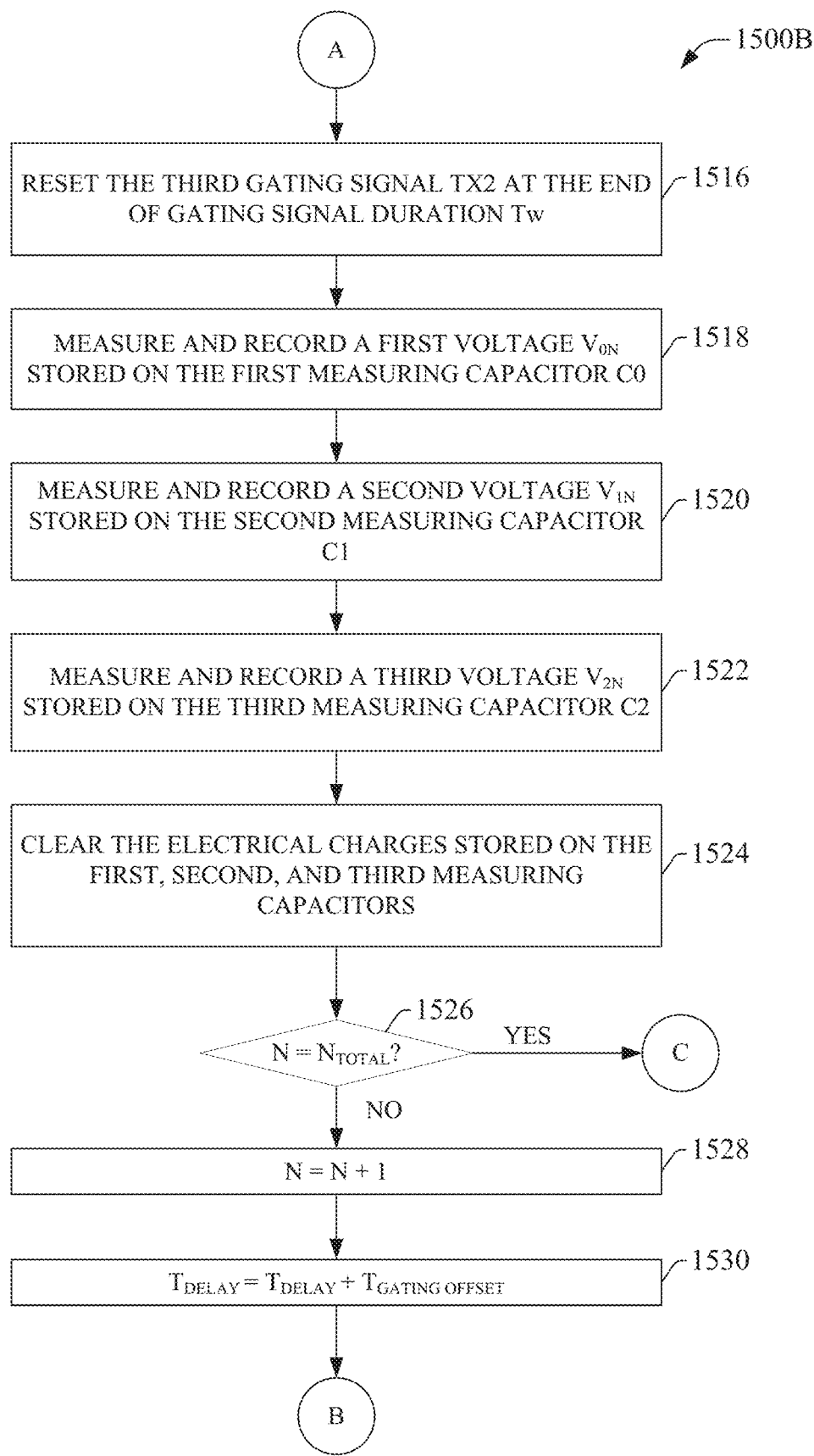
FIG. 15B is a flowchart of a second part of the example methodology for determining a distance of an object or surface corresponding to a pixel of a TOF sensor image.
Figure 15C:
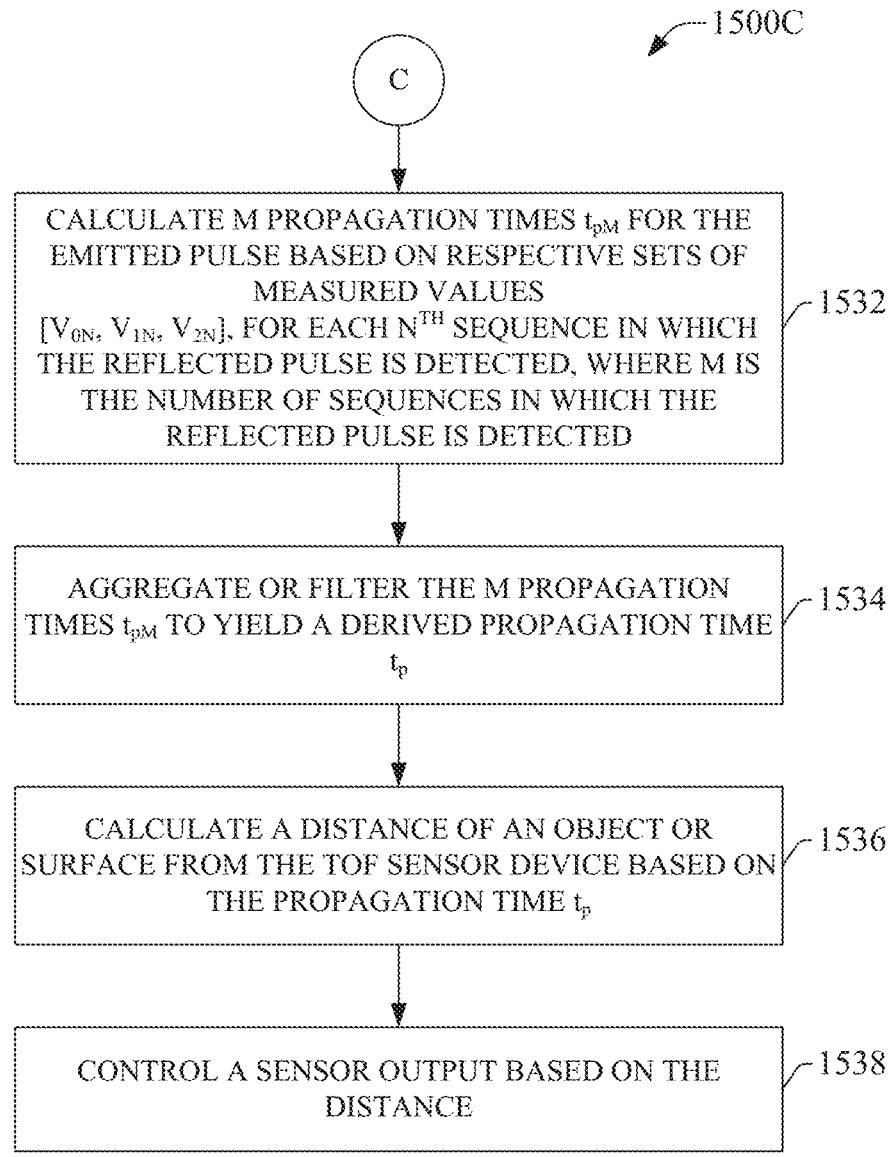
FIG. 15C is a flowchart of a third part of the example methodology for determining a distance of an object or surface corresponding to a pixel of a TOF sensor image.

The methodology continues with the second part 1500B illustrated in FIG. 15B. AT 1516, the third gating signal TX2 is reset at the end of the gating signal duration Tw measured relative to the start of the third gating signal TX2 at step 1514. At 1518, a first voltage V$_{ON}$ stored on the first measuring capacitor C0 is measured and recorded. At 1520, a second voltage V$_{1N}$ stored on the second measuring capacitor C1 is measured and recorded. At 1522, a third voltage V$_{2N}$ stored on the second measuring capacitor C2 is measured and recorded.

At 1526, a determination is made as to whether sequence tracking integer N is equal to N$_{TOTAL}$, which represents the total number of gating sequences to be executed. If N is not equal to N$_{TOTAL}$ (NO at step 1526), the methodology proceeds to step 1528, where sequence tracking integer N is incremented by one. At 1530, T$_{DELAY}$ is set equal to the current value of T$_{DELAY}$ plus a gating offset time T$_{GATING\ OFFSET}$. Offset time T$_{GATING\ OFFSET}$ is the time by which consecutive gating sequences are offset from one another. For example, in the scenario described above in connection with FIG. 12, T$_{GATING\ OFFSET}$ is equal to twice the gating time (2Tw), while in the example described above in connection with FIG. 13, T$_{GATING\ OFFSET}$ is equal to half the gating time (Tw/2). In some embodiments, T$_{GATING\ OFFSET}$ may be a function of the sequence tracking integer N, rather than being constant across the measuring sequences. The methodology then returns to step 1506, and steps 1506-1524 are repeated. In this next iteration of steps 1506-1524, since T$_{DELAY}$ has been increased by offset time T$_{GATING\ OFFSET}$, the setting of the first gating signal TX0 at step 1510 is delayed relative to the previous iteration by T$_{GATING\ OFFSET}$. As a result, voltage values V$_{ON}$, V$_{1N}$, and V$_{2N}$ recorded at steps 1518-1522 may be different than the previously recorded set of voltage values depending on the time, within the pulse period, that the reflected pulse corresponding to the pulse emitted at step 1506 is received.

Steps 1506-1524 are executed N$_{TOTAL}$ times, with T$_{DELAY}$ being increased by T$_{GATING\ OFFSET}$ for each iteration. This results in N$_{TOTAL}$ sets of recorded voltage values [V$_{ON}$, V$_{1N}$, and V$_{2N}$]. When N$_{TOTAL}$ iterations have been completed (YES at step 1526), the methodology proceeds to the third part 1500C illustrated in FIG. 15C.

At 1532, M propagation times t$_{pM}$ are calculated for the emitted light pulse based on respective sets of measured values [V$_{ON}$, V$_{1N}$, V$_{2N}$] (measured at steps 1518-1522) for each N$^{th}$ gating sequence in which the reflected pulse is detected, where M is the number of gating sequences in which the reflected pulse is detected. The number of gating sequences in which the pulse is detected depends on the size of T$_{GATING\ OFFSET}$ relative to the width of the received light pulse. For example, if T$_{GATING\ OFFSET}$ is twice the pulse width (as in the example depicted in FIG. 12), the light pulse will be detected by only one of the gating sequences (M=1). If T$_{GATING\ OFFSET}$ is half of the pulse width (as in the example depicted in FIG. 13), the light pulse will be detected by at least two gating sequences (M>=2).

The gating sequences that detect the received light pulse can be identified based on a comparison of relative magnitudes of the measured values [VON, V$_{1N}$, V$_{2N}$] for each set. For example, for a gating sequence in which the received pulse is not detected, measured values [V$_{ON}$, V$_{1N}$, V$_{2N}$] for that sequence will be substantially equal to one another (representative of ambient light only). For gating sequences in which the received pulse is detected, one or two of the measured values [V$_{ON}$, V$_{1N}$, and V$_{2N}$] for that sequence will be larger than a third value of the set (in most cases, two of the values representing a leading edge and trailing edge will be larger than the third value representing ambient light; however, in less likely scenarios in which the pulse falls exactly between two sampling points, one value may be representative of the entire received pulse). In most cases, the reflected pulse is detected by a measuring sequence if the time t=Ts01N or t=Ts12N for that sequence coincides with a duration during which the reflected pulse is being received by the photo-detector.

Once the M sets of values [VON, V$_{1N}$, and V$_2$N] representing detection of the light pulse have been identified, each of the M propagation times t$_{pM}$ can be calculated in step 1532 based on equation (14) (or a reasonable variation) using values [V$_{ON}$, V$_{1N}$, and V$_{2N}$]m (and replacing time Ts12 with the appropriate sample point time corresponding to the M$^{th}$ set of measured values [V$_{ON}$, V$_{1N}$, and V$_{2N}$]$_M$).

At 1534, the M propagation times t$_{pM}$ are aggregated or filtered to yield a derived propagation time t$_p$. For scenarios in which the reflected pulse is detected by only one gating sequence, the derived propagation time t$_p$ is derived based solely on the values [V$_{ON}$, V$_{1N}$, and V$_{2N}$] corresponding to the gating sequence that detected the pulse. If the reflected pulse is detected by more than one gating sequence, the M propagation times t$_{pM}$ are aggregated or filtered using any suitable technique. For example, propagation time t$_p$ can be derived by averaging the M propagation times t$_p$M, by selecting one of the M propagation times t$_p$M that satisfies a selection criterion (e.g., the smallest propagation time), by eliminating a subset of the M propagation times t$_{pM}$ that are determined to be outside a defined tolerance, or by using another combination or filtering technique.

Although steps 1532 and 1534 determine a propagation time t$_p$ based on a determination of M propagation times t$_p$M calculated from M sets of values [V$_{ON}$, V$_{1N}$, and V$_{2N}$], some embodiments may use the multiple measurements [V$_{ON}$, V$_{1N}$, and V$_{2N}$] to calculate the propagation time t$_p$ using other methods (e.g., a center of mass method using two sets of measurements).

At 1536, a distance of an object or surface from the TOF sensor device is calculated based on the propagation time t$_p$ derived at step 1534 (e.g., using equation (1) or a reasonable variation). At 1538, a sensor output is controlled based on the distance derived at step 1536.

Although the two methodologies described above in connection with FIGS. 14A-C and 15A-C were described separately, the two methodologies can be combined within a common sensor device without departing from the scope of one or more embodiments of this disclosure.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including Device-Net, ControlNet, safety networks, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 16:
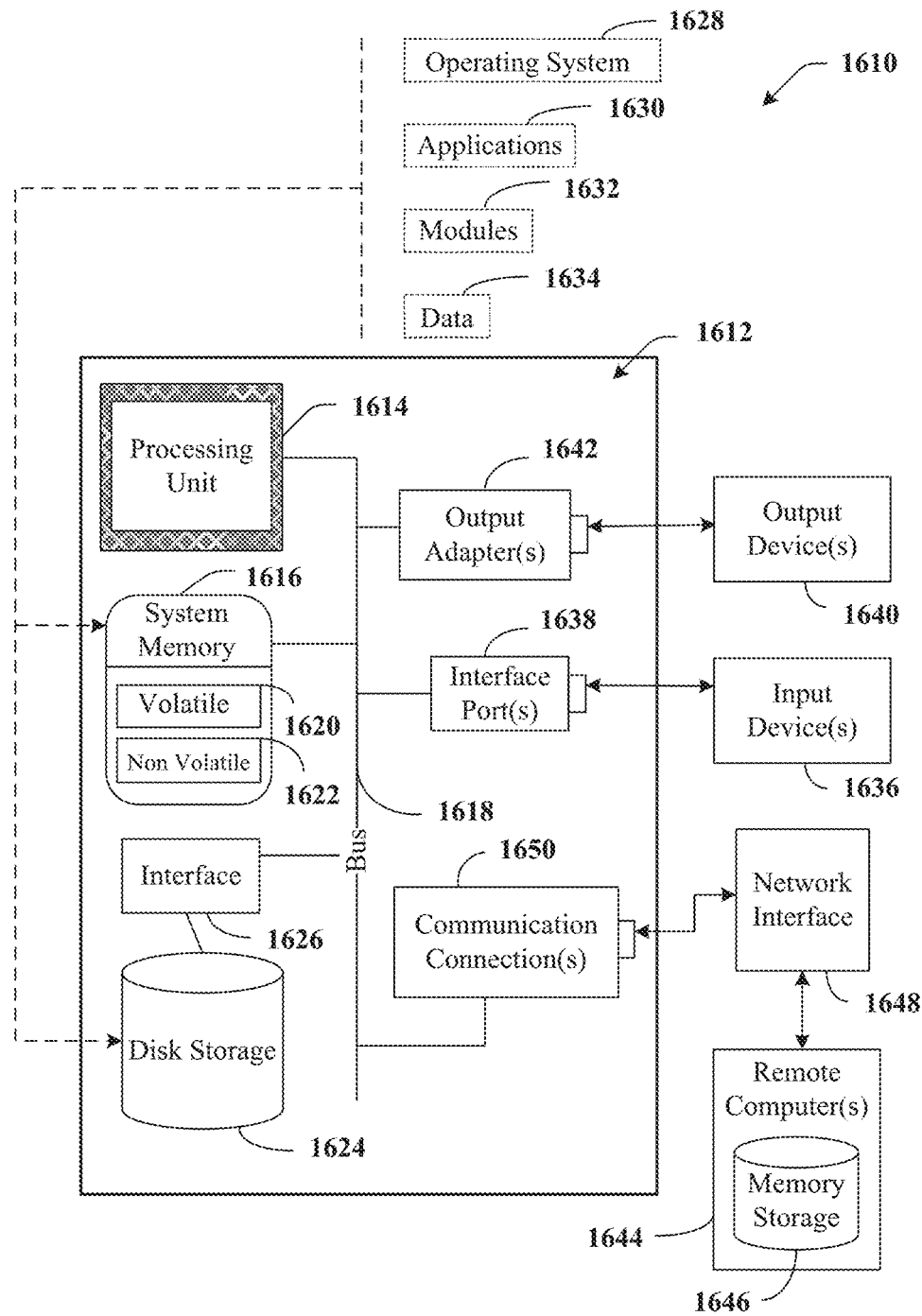
FIG. 16 is an example computing environment.
Figure 17:
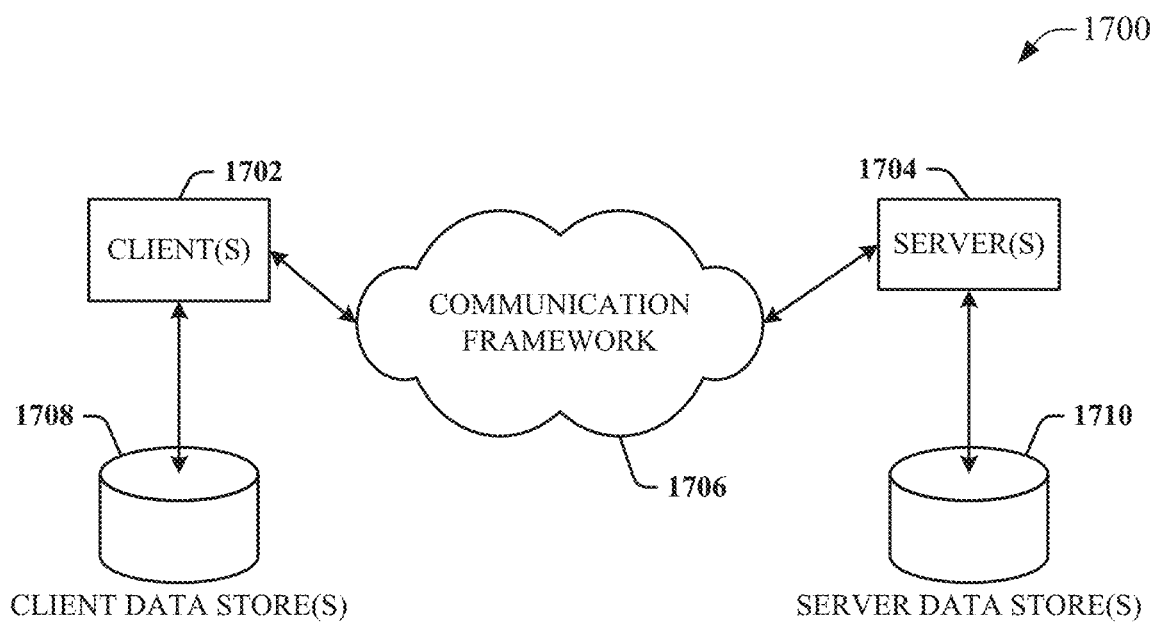
FIG. 17 is an example networking environment.

In order to provide a context for the various aspects of the disclosed subject matter, FIGS. 16 and 17 as well as the following discussion are intended to provide a brief, general description of a suitable environment in which the various aspects of the disclosed subject matter may be implemented.

With reference to FIG. 16, an example environment 1610 for implementing various aspects of the aforementioned subject matter includes a computer 1612. The computer 1612 includes a processing unit 1614, a system memory 1616, and a system bus 1618. The system bus 1618 couples system components including, but not limited to, the system memory 1616 to the processing unit 1614. The processing unit 1614 can be any of various available processors. Multi-core microprocessors and other multiprocessor architectures also can be employed as the processing unit 1614.

The system bus 1618 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1616 includes volatile memory 1620 and nonvolatile memory 1622. The basic input/output system (BIOS), containing the basic routines to transfer information between elements within the computer 1612, such as during start-up, is stored in nonvolatile memory 1622. By way of illustration, and not limitation, nonvolatile memory 1622 can include read only memory (ROM), programmable ROM (PROM), electrically programmable ROM (EPROM), electrically erasable PROM (EEPROM), or flash memory. Volatile memory 1620 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1612 also includes removable/non-removable, volatile/non-volatile computer storage media. FIG. 16 illustrates, for example a disk storage 1624. Disk storage 1624 includes, but is not limited to, devices like a magnetic disk drive, floppy disk drive, tape drive, Jaz drive, Zip drive, LS-100 drive, flash memory card, or memory stick. In addition, disk storage 1624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1624 to the system bus 1618, a removable or non-removable interface is typically used such as interface 1626.

It is to be appreciated that FIG. 16 describes software that acts as an intermediary between users and the basic computer resources described in suitable operating environment 1610. Such software includes an operating system 1628. Operating system 1628, which can be stored on disk storage 1624, acts to control and allocate resources of the computer 1612. System applications 1630 take advantage of the management of resources by operating system 1628 through program modules 1632 and program data 1634 stored either in system memory 1616 or on disk storage 1624. It is to be appreciated that one or more embodiments of the subject disclosure can be implemented with various operating systems or combinations of operating systems.

A user enters commands or information into the computer 1612 through input device(s) 1636. Input devices 1636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1614 through the system bus 1618 via interface port(s) 1638. Interface port(s) 1638 include, for example, a serial port, a parallel port, a game port, and a universal serial bus (USB). Output device(s) 1640 use some of the same type of ports as input device(s) 1636. Thus, for example, a USB port may be used to provide input to computer 1612, and to output information from computer 1612 to an output device 1640. Output adapters 1642 are provided to illustrate that there are some output devices 1640 like monitors, speakers, and printers, among other output devices 1640, which require special adapters. The output adapters 1642 include, by way of illustration and not limitation, video and sound cards that provide a means of connection between the output device 1640 and the system bus 1618. It should be noted that other devices and/or systems of devices provide both input and output capabilities such as remote computer(s) 1644.

Computer 1612 can operate in a networked environment using logical connections to one or more remote computers, such as remote computer(s) 1644. The remote computer(s) 1644 can be a personal computer, a server, a router, a network PC, a workstation, a microprocessor based appliance, a peer device or other common network node and the like, and typically includes many or all of the elements described relative to computer 1612. For purposes of brevity, only a memory storage device 1646 is illustrated with remote computer(s) 1644. Remote computer(s) 1644 is logically connected to computer 1612 through a network interface 1648 and then physically connected via communication connection 1650. Network interface 1648 encompasses communication networks such as local-area networks (LAN) and wide-area networks (WAN). LAN technologies include Fiber Distributed Data Interface (I-DDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1650 refers to the hardware/software employed to connect the network interface 1648 to the system bus 1618. While communication connection 1650 is shown for illustrative clarity inside computer 1612, it can also be external to computer 1612. The hardware/software necessary for connection to the network interface 1648 includes, for exemplary purposes only, internal and external technologies such as, modems including regular telephone grade modems, cable modems and DSL modems, ISDN adapters, and Ethernet cards.

FIG. 17 is a schematic block diagram of a sample computing environment 1700 with which the disclosed subject matter can interact. The sample computing environment 1700 includes one or more client(s) 1702. The client(s) 1702 can be hardware and/or software (e.g., threads, processes, computing devices). The sample computing environment 1700 also includes one or more server(s) 1704. The server(s) 1704 can also be hardware and/or software (e.g., threads, processes, computing devices). The servers 1704 can house threads to perform transformations by employing one or more embodiments as described herein, for example. One possible communication between a client 1702 and servers 1704 can be in the form of a data packet adapted to be transmitted between two or more computer processes. The sample computing environment 1700 includes a communication framework 1706 that can be employed to facilitate communications between the client(s) 1702 and the server(s) 1704. The client(s) 1702 are operably connected to one or more client data store(s) 1708 that can be employed to store information local to the client(s) 1702. Similarly, the server(s) 1704 are operably connected to one or more server data store(s) 1710 that can be employed to store information local to the servers 1704.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A time of flight sensor device, comprising:
   an emitter component configured to emit a light pulse at a first time during each measuring sequence of multiple measuring sequences of a distance measurement operation;
   a photo-sensor component comprising a photo-detector, the photo-detector comprising
      a photo device configured to generate electrical energy in proportion to a quantity of received light, and
      multiple measuring capacitors comprising at least
         a first measuring capacitor connected to the photo device via a first control line switch controlled by a first gating signal, and
         a second measuring capacitor connected to the photo device via a second control line switch controlled by a second gating signal,
   wherein the photo-sensor component is configured to, for each measuring sequence, designate the first gating signal to be one of a first signal or a second signal, designate the second gating signal to be another of the first signal or the second signal, set the first signal at a second time during the measuring sequence defined relative to the first time, and reset the first signal at a third time during the measuring sequence defined relative to the first time, wherein setting the first signal at the second time and resetting the first signal at the third time causes a first portion of the electrical energy to be stored in a corresponding first capacitor of the first measuring capacitor or the second measuring capacitor, and set the second signal at the third time and reset the second signal at a fourth time during the measuring sequence defined relative to the first time, wherein setting the second signal at the third time and resetting the second signal at the fourth time causes a second portion of the electrical energy to be stored in a corresponding second capacitor of the first measuring capacitor or the second measuring capacitor, and wherein the photo-sensor component is further configured to perform at least two of the multiple measuring sequences using respective different designations for the first signal and the second signal; and a distance determination component configured to determine a propagation time for the light pulse based on first measured values of the first portion of the electrical energy measured on the first capacitor for the multiple measuring sequences and second measured values of the second portion of the electrical energy measured on the second capacitor for the multiple measuring sequences.

2. The time of flight sensor device of claim 1, wherein the distance determination component is configured to determine the propagation time based on a first sum of the first measured values and a second sum of the second measured values.

3. The time of flight sensor device of claim 1, wherein the multiple measuring capacitors further comprise at least a third measuring capacitor connected to the photo device via a third control line switch controlled by a third gating signal, the photo-sensor component is further configured to, for each measuring sequence, designate the first gating signal to be one of the first signal, the second signal, or a third signal, designate the second gating signal to be another of the first signal, the second signal, or the third signal, designate the third gating signal to be a remaining one of the first signal, the second signal, or the third signal, set the first signal at the second time and reset the first signal at the third time causing the first portion of the electrical energy to be stored in the corresponding first capacitor of the first measuring capacitor, the second measuring capacitor, or the third measuring capacitor, set the second signal at the third time and reset the second signal at the fourth time causing the second portion of the electrical energy to be stored in the corresponding second capacitor of the first measuring capacitor, the second measuring capacitor, and the third measuring capacitor, and set the third signal at the fourth time and reset the third signal at a fifth time during the measuring sequence defined relative to the first time, wherein setting the third signal at the fourth time and resetting the third signal at the fifth time causes a third portion of the electrical energy to be stored in a corresponding third capacitor of the first measuring capacitor, the second measuring capacitor, or the third measuring capacitor, the photo-sensor component is further configured to perform at least three of the multiple measuring sequences using respective different designations for the first signal, the second signal, and the third signal, and the distance determination component is configured to determine the propagation time based on the first measured values, the second measured values, and third measured values of the third portion of the electrical energy measured on the third capacitor for the multiple measuring sequences.

4. The time of flight sensor device of claim 3, wherein the distance determination component is configured to, in response to a determination that the first measured values represent a leading edge portion of a reflected light pulse, subtract a third sum of the third measured values from the first sum of the first measured values to yield a leading edge value, subtract the third sum of the third measured values from the second sum of the second measured values to yield a trailing edge value, and determine the propagation time based on a ratio of the trailing edge value to a total of the leading edge value and the trailing edge value.

5. The time of flight sensor of claim 4, wherein the distance determination component is configured to determine that the first measured values represent the leading edge portion of the reflected light pulse based on a determination that the first sum of the first measured values and the second sum of the second measured values are greater than the third sum of the third measured values.

6. The time of flight sensor device of claim 3, wherein the distance determination component is configured to, in response to a determination that the second measured values represent a leading edge portion of a reflected light pulse, subtract the first sum of the first measured values from the second sum of the second measured values to yield a leading edge value, subtract the first sum of the first measured values from a third sum of the third measured values to yield a trailing edge value, and determine the propagation time based on a ratio of the trailing edge value to a total of the leading edge value and the trailing edge value.

7. The time of flight sensor device of claim 3, wherein the distance determination component is configured to determine the propagation time based on $$t_p = (V_{2a}+V_{0b}+V_{1c}) - (V_{0a}+V_{1b}+V_{2c})/(V_{1a}+V_{2b}+V_{0c}) + (V_{2a}+V_{0b}+V_{1c}) - 2 \cdot (V_{0a}+V_{1b}+V_{2c})T_0 + T_s$$

where $t_p$ is the propagation time, $T_0$ is a duration of the light pulse, $V_{0a}$ is one of the first measured values measured on the first measuring capacitor for a first measuring sequence of the multiple measuring sequences, $V_{1a}$ is one of the second measured values measured on the second measuring capacitor for the first measuring sequence, $V_{2a}$ is one of the third measured values measured on the third measuring capacitor for the first measuring sequence, $V_{0b}$ is one of the third measured values measured on the first measuring capacitor for a second measuring sequence of the multiple measuring sequences, $V_{1b}$ is one of the first measured values measured on the second measuring capacitor for the second measuring sequence, $V_{2b}$ is one of the second measured values measured on the third measuring capacitor for the second measuring sequence, $V_{0c}$ is one of the second measured values measured on the first measuring capacitor for a third measuring sequence of the multiple measuring sequences, $V_{1c}$ is one of the third measured value measured on the second measuring capacitor for the third measuring sequence, $V_{2c}$ is one of the first measured values measured on the third measuring capacitor for the third measuring sequence, and $T_s$ is a sampling time, where $T_s$ is the third time if the first measured values represent a leading edge portion of a reflected light pulse, and $T_s$ is the fourth time if the second measured values represent the leading edge portion of the reflected light pulse.

8. The time of flight sensor of claim 3, wherein
the photo-sensor component is further configured to designate each of the first gating signal, the second gating signal, and the third gating signal to be one of the first signal, the second signal, or the third signal for each of the at least three of the multiple measuring sequences according to a circular shift designation criterion for consecutive measuring sequences of the at least three of the multiple measuring sequences.

9. The time of flight sensor device of claim 1, wherein
the distance determination component is further configured to determine, based on the propagation time, a distance of an object or a surface corresponding to a pixel that corresponds to the photo-detector, and
the time of flight sensor device further comprises a control output component configured to generate an output signal in response to determining that the distance satisfies a defined criterion.

10. The time of flight sensor of claim 9, wherein the time of flight sensor is a component of an industrial safety system, and the output signal is configured to at least one of disconnect power from an industrial machine, place an industrial automation system in safe operation mode, or send a notification to one or more client devices.

11. A method for measuring a distance of an object, comprising:
generating, by a photo device of a photo-detector of a time of flight sensor device comprising a processor, electrical energy in proportion to a quantity of light received at the photo device;
performing a distance measuring operation comprising multiple measuring sequences, wherein the performing comprises, for each measuring sequence of the multiple measuring sequences:
designating a first gating signal to be one of a first signal or a second signal,
designating a second gating signal to be another of the first signal or the second signal,
emitting, by the time of flight sensor device, a light pulse at a first time within the measuring sequence,
setting, by the time of flight sensor device, the first signal at a second time during the measuring sequence defined relative to the first time,
resetting, by the time of flight sensor device, the first signal at a third time during the measuring sequence defined relative to the first time, wherein the setting the first signal and the resetting the first signal causes a first portion of the electrical energy to be stored in a first capacitor corresponding to the first signal, the first capacitor being one of a first measuring capacitor or a second measuring capacitor respectively corresponding to the first gating signal and the second gating signal,
setting, by the time of flight sensor device, the second signal at the third time, and
resetting, by the time of flight sensor device, the second signal at a fourth time during the measuring sequence defined relative to the first time, wherein the setting the second signal and the resetting the second signal causes a second portion of the electrical energy to be stored in a second capacitor corresponding to the second signal, the second capacitor being one of the first measuring capacitor or the second measuring capacitor, and
wherein the performing further comprises performing at least two of the multiple measuring sequences using respective different designations for the first signal and the second signal; and
determining, by the time of flight sensor device, a propagation time for the light pulse based on first measured values of the first portion of the electrical energy obtained by the multiple measuring sequences and second measured values of the second portion of the electrical energy obtained by the multiple measuring sequences.

12. The method of claim 11, wherein the determining the propagation time comprises:
summing the first measured values to yield a first sum,
summing the second measured values to yield a second sum, and
determining the propagation time based on the first sum and the second sum.

13. The method of claim 11, wherein
the first capacitor is one of the first measuring capacitor, the second measuring capacitor, or a third measuring capacitor,
the second capacitor is one of the first measuring capacitor, the second measuring capacitor or the third measuring capacitor,
the designating the first gating signal comprises designating the first gating signal to be one of the first signal, the second signal, or a third signal,
the designating the second gating signal comprises designating the second gating signal to be another of the first signal, the second signal, or a third signal, and
the performing the distance measuring operation further comprises, for each measuring sequence of the multiple measuring sequences:
designating a third gating signal to be a remaining one of the first signal, the second signal, or the third signal,
setting, by the time of flight sensor device, the third signal at the fourth time,
resetting, by the time of flight sensor device, the third signal at a fifth time during the measuring sequence defined relative to the first time, wherein the setting the third signal and the resetting the third signal causes a third portion of the electrical energy to be stored in a third capacitor corresponding to the third signal, the third capacitor being one of the first measuring capacitor, the second measuring capacitor, or the third measuring capacitor, and performing at least three of the multiple measuring sequences using respective different designations for the first signal, the second signal, and the third signal, and the determining comprises determining the propagation time based on the first measured values, the second measured values, and third measured values of the third portion of the electrical energy obtained by the multiple measuring sequences.

14. The method of claim 13, wherein the determining the propagation time further comprises:

in response to determining that the first measured values represent a leading edge portion of a reflected light pulse:

subtracting a third sum of the third measured values from the first sum to yield a leading edge value, subtracting the third sum from the second sum to yield a trailing edge value, and determining the propagation time based on a ratio of the trailing edge value to a total of the leading edge value and the trailing edge value.

15. The method of claim 13, wherein the determining the propagation time further comprises:

in response to determining that the second measured values represent a leading edge portion of a reflected light pulse:

subtracting the first sum from the second sum to yield a leading edge value, subtracting the first sum from a third sum of the third measured values to yield a trailing edge value, and determining the propagation time based on a ratio of the trailing edge value to a total of the leading edge value and the trailing edge value.

16. The method of claim 13, wherein the performing the at least three of the measuring sequences using respective different designations for the first signal, the second signal, and the third signal comprises designating each of the first gating signal, the second gating signal, and the third gating signal to be one of the first signal, the second signal, or the third signal for each of the at least three of the multiple measuring sequences according to a circular shift designation for consecutive measuring sequences of the at least three of the multiple measuring sequences.

17. The method of claim 11, further comprising:

determining, based on the propagation time, a distance of an object or a surface corresponding to a pixel monitored by the photo-detector; and generating a control output signal directed to an industrial device in response to determining that the distance satisfies a criterion.

18. A non-transitory computer-readable medium having stored thereon instructions that, in response to execution, cause a time of flight sensor device comprising a processor and a photo device that generates electrical energy in proportion to a quantity of received light, to perform operations, the operations comprising:

performing multiple measuring sequences of a distance measurement operation, wherein the performing comprises, for each measuring sequence of the multiple measuring sequences:

assigning each of a first gating signal and a second gating signal to be one of a first signal or a second signal, wherein the first gating signal and the second gating signal control transfer of the electrical energy to a first measuring capacitor and a second measuring capacitor, respectively, initiating emission of a light pulse at a first time within the measuring sequence, setting the first signal at a second time during the measuring sequence defined relative to the first time, resetting the first signal at a third time during the measuring sequence defined relative to the first time, wherein the setting the first signal and the resetting the first signal causes a first portion of the electrical energy to be stored in a first capacitor corresponding to the first signal, and the first capacitor is one of the first measuring capacitor or the second measuring capacitor, setting the second signal at the third time, and resetting the second signal at a fourth time during the measuring sequence defined relative to the first time, wherein the setting the second signal and the resetting the second signal causes a second portion of the electrical energy to be stored in a second capacitor corresponding to the second signal, and the second capacitor is one of the first measuring capacitor or the second measuring capacitor, and wherein the performing further comprises reassigning each of the first gating signal and the second gating signal to be a different one of the first signal or the second signal for different measuring sequences of the multiple measuring sequences; and determining a propagation time for the light pulse based on first measured values of the first portion of the electrical energy obtained by the multiple measuring sequences and second measured values of the second portion of the electrical energy obtained by the multiple measuring sequences.

19. The non-transitory computer-readable medium of claim 18, wherein the determining the propagation time comprises:

summing the first measured values to yield a first sum, summing the second measured values to yield a second sum, and determining the propagation time based on the first sum and the second sum.

20. The non-transitory computer-readable medium of claim 19, further comprising:

determining, based on the propagation time, a distance of an object or a surface corresponding to a pixel monitored by the photo-detector; and generating a control output signal directed to an industrial device in response to determining that the distance satisfies a criterion.

* * * * *